United States Patent
Yasuda et al.

(10) Patent No.: US 8,862,366 B2
(45) Date of Patent: Oct. 14, 2014

(54) CONTROLLER FOR AND METHOD OF CONTROLLING INTERNAL COMBUSTION ENGINE

(75) Inventors: Hiromichi Yasuda, Gotemba (JP); Yusuke Suzuki, Hadano (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 398 days.

(21) Appl. No.: 13/255,647

(22) PCT Filed: Mar. 9, 2010

(86) PCT No.: PCT/IB2010/000483
§ 371 (c)(1),
(2), (4) Date: Nov. 2, 2011

(87) PCT Pub. No.: WO2010/103372
PCT Pub. Date: Sep. 16, 2010

(65) Prior Publication Data
US 2012/0053819 A1    Mar. 1, 2012

(30) Foreign Application Priority Data

Mar. 11, 2009   (JP) .................. 2009-058615
Oct. 30, 2009   (JP) .................. 2009-249985

(51) Int. Cl.
*F02D 28/00*     (2006.01)
*F02D 35/02*     (2006.01)
*F02D 41/22*     (2006.01)

(52) U.S. Cl.
CPC ............. *F02D 35/02* (2013.01); *F02D 35/024* (2013.01); *F02D 41/222* (2013.01); *Y02T 10/40* (2013.01); *F02D 35/023* (2013.01); *F02D 35/028* (2013.01)
USPC .......................... 701/102; 123/435

(58) Field of Classification Search
CPC ..... F02D 28/00; F02D 35/023; F02D 11/105; F02D 41/1456; F02D 41/1486; F02D 41/222; F02D 41/28; G01M 15/01; F02M 25/0722; F02M 25/0777; G06F 11/3409; G06F 17/18
USPC ........ 123/435, 488, 568.17, 568.22; 701/102, 701/109–111, 114; 73/114.16
See application file for complete search history.

(56) References Cited

U.S. PATENT DOCUMENTS 5,765,530 A * 6/1998 Machida et al. ......... 123/406.43
7,440,841 B2 * 10/2008 Ripley ..................... 701/111

(Continued)

FOREIGN PATENT DOCUMENTS

DE    10 2005 047 087 A1    4/2007

(Continued)

OTHER PUBLICATIONS

International Search Report and Written Opinion for corresponding International Patent Application No. PCT/IB2010/000483 mailed Jul. 2, 2010.

(Continued)

*Primary Examiner* — John Kwon
*Assistant Examiner* — Johnny H Hoang
(74) *Attorney, Agent, or Firm* — Sughrue Mion, PLLC

(57) ABSTRACT

Heat generation amount $PV^\kappa(\theta)$ is calculated with the use of cylinder pressure $P(\theta)$, detected by a cylinder pressure sensor, cylinder volume $V(\theta)$, and specific heat ratio $\kappa$ (steps 100 to 102). A crank angle $\theta_{fix}$, at which the value of $PV^\kappa(\theta)$ peaks, is determined as a start crank angle, at which an adiabatic process after combustion starts (step 104). A correction coefficient $K_{fix}$ is calculated based on the variation of the value of $PV^\kappa(\theta)$ after $\theta_{fix}$ (step 106). An actual heat generation amount $PV^\kappa{}_{fix}(\theta)$ is calculated with the use of the correction coefficient $K_{fix}$ (step 110). A cooling loss coefficient $K_{cool}$ that determines a correlation between the cooling loss and crank angles may be calculated based on a water temperature and an engine speed and the actual heat generation amount $PV^\kappa{}_{fix}(\theta)$ may be made to reflect the cooling loss coefficient $K_{cool}$.

25 Claims, 12 Drawing Sheets

(56) References Cited

U.S. PATENT DOCUMENTS

| | | | |
|---|---|---|---|
| 7,454,286 B2 * | 11/2008 | Sinnamon et al. | 701/110 |
| 2002/0087256 A1 * | 7/2002 | Dixon et al. | 701/102 |
| 2008/0264382 A1 * | 10/2008 | Kang | 123/435 |
| 2009/0005954 A1 * | 1/2009 | Sinnamon et al. | 701/102 |

FOREIGN PATENT DOCUMENTS

| | | |
|---|---|---|
| DE | 10 2007 000 294 A1 | 12/2007 |
| DE | 10 2007 057 142 A1 | 6/2009 |
| JP | 6-265430 A | 9/2004 |
| JP | 2005-351146 A | 12/2005 |
| JP | 2007-040207 A | 2/2007 |

OTHER PUBLICATIONS

International Preliminary Report on Patentability for corresponding International Patent Application No. PCT/IB2010/000483 mailed Jun. 27, 2011.

\* cited by examiner

CONTROLLER FOR AND METHOD OF CONTROLLING INTERNAL COMBUSTION ENGINE

BACKGROUND OF THE INVENTION

1. Field of the Invention

The invention relates to an internal combustion engine controller and a method of controlling an internal combustion engine, and in particular to a controller for and a method of controlling an internal combustion engine equipped with a cylinder pressure sensor.

2. Description of the Related Art

The sensitivity of a cylinder pressure sensor varies with time and there are individual differences in sensitivity between the cylinder pressure sensors. Thus, Japanese Patent Application Publication No. 2005-351146 (JP-A-2005-351146), for example, discloses an internal combustion engine controller that makes it possible to estimate the sensitivity of the cylinder pressure sensor. More specifically, in this controller, an estimate of the sensitivity of the cylinder pressure sensor is calculated based on the cylinder pressure at a predetermined crank angle $\theta_0$ in an intake stroke, the intake air pressure at the point, at which the crank angle becomes $\theta_0 + \lambda$, and the cylinder pressure and the cylinder volume at at least two points of crank angles $\theta_1$, $\theta_2$ in a compression stroke. By using the accurate estimate of the sensitivity calculated in this way, it is possible to accurately obtain the information on the internal conditions of a cylinder and it is therefore possible to effectively use the information in controlling the internal combustion engine.

The cylinder pressure sensor is installed so as to be exposed to the inside of a cylinder of the internal combustion engine. Thus, when the sensor is exposed to a high-temperature gas, there is a fear that a thermal strain occurs in constituent parts and an error is caused in the output from the sensor. As measures against such an error, Japanese Patent Application Publication No. 6-265430 (JP-A-6-265430) describes a device for improving the accuracy in measuring pressure in terms of the hardware of the sensor.

However, when it is tried to improve the pressure measurement accuracy in terms of the hardware of the sensor as in the case of the above-described conventional cylinder pressure sensor, the construction of the sensor becomes complicated, which reduces practicality. Thus, it has been desired to eliminate the errors in the output caused by the thermal strain of the cylinder pressure sensor on the computer board side.

SUMMARY OF THE INVENTION

The invention provides a controller for an internal combustion engine equipped with a cylinder pressure sensor, the controller being capable of correcting the errors in the output caused by thermal strain of the cylinder pressure sensor by simple calculation.

A first aspect of the invention is an internal combustion engine controller characterized by including: a cylinder pressure sensor that detects a cylinder pressure at a predetermined crank angle of an internal combustion engine; a heat generation amount calculation section that, with the use of the cylinder pressure detected by the cylinder pressure sensor, a cylinder volume when the cylinder pressure is detected, and a specific heat ratio of a gas in a cylinder, calculates a heat generation amount that is a product of the cylinder pressure and a value that is obtained by raising the cylinder volume to the power of the specific heat ratio; and a heat generation amount error calculation section that, with the use of a correlation between the heat generation amount in an adiabatic process after combustion and crank angles, calculates a heat generation amount error at the predetermined crank angle in the adiabatic process.

According to this configuration, because there is a certain correlation between crank angles and the amount of heat generated in the adiabatic process after combustion, it is possible to highly accurately calculate the heat generation amount error at the predetermined crank angle based on the correlation.

In the above first aspect, the internal combustion engine controller may further include an actual heat generation amount calculation section that calculates, as an actual heat generation amount, a value that is obtained by subtracting the heat generation amount error from the heat generation amount at the predetermined crank angle.

According to this configuration, because the heat generation amount error is superimposed on the heat generation amount in the adiabatic process after combustion, it is possible to highly accurately estimate the actual heat generation amount at the predetermined crank angle by subtracting the heat generation amount error from the heat generation amount.

In the above first aspect, the internal combustion engine controller may further include an actual cylinder pressure calculation section that calculates an actual cylinder pressure at the predetermined crank angle based on the actual heat generation amount.

According to this configuration, the actual cylinder pressure at the predetermined crank angle is calculated based on the calculated actual heat generation amount. Thus, according to the invention, it is possible to highly accurately correct the errors in the output caused by the thermal strain of the cylinder pressure sensor.

In the above first aspect, the heat generation amount error calculation section may include a correction coefficient calculation section that calculates a correction coefficient that determines the correlation between the heat generation amount and the crank angles, with the use of the heat generation amount at at least two points in the adiabatic process. The heat generation amount error calculation section may calculate the heat generation amount error with the use of a crank angle period from a start crank angle, at which the adiabatic process starts, to the predetermined crank angle, and the correction coefficient.

According to this configuration, the correction coefficient that determines the correlation between crank angles and the heat generation amount in the adiabatic process after combustion is calculated. The heat generation amount is theoretically constant in the adiabatic process after combustion. Thus, according to the invention, it is possible to accurately calculate the heat generation amount error at the predetermined crank angle with the use of the correction coefficient and the crank angle period from the start crank angle, at which the adiabatic process starts, to the predetermined crank angle.

In the above first aspect, the start crank angle may be the crank angle, at which the heat generation amount peaks.

According to this configuration, the crank angle, at which the heat generation amount peaks, is determined as the start crank angle, at which the adiabatic process starts. Thus, according to the invention, it is possible to determine the start crank angle by a simple method.

In the above first aspect, the start crank angle may be the crank angle corresponding to the intersection of a straight line that approximates the variation of mass fraction of burned fuel (MFB) in a combustion process and a straight line that approximates the variation of MFB in an adiabatic expansion process subsequent to the combustion process.

According to this configuration, it is possible to accurately calculate the start crank angle even in the case where the heat generation amount does not have the maximum value.

In the above first aspect, the internal combustion engine controller may further include: a cooling loss calculation section that calculates a cooling loss of the heat generation amount at the predetermined crank angle in the adiabatic process; and a cooling loss elimination section that subtracts the cooling loss from the actual heat generation amount at the predetermined crank angle.

According to this configuration, the cooling loss of the heat generation amount is subtracted from the actual heat generation amount. Thus, according to the invention, it is possible to highly accurately calculate the actual heat generation amount with the influence of the cooling loss taken into consideration.

In the above first aspect, the cooling loss calculation section may include a cooling loss coefficient calculation section that calculates a cooling loss coefficient that determines a correlation between the cooling loss and the crank angles based on a water temperature and an engine speed of the internal combustion engine. The cooling loss calculation section may calculate the cooling loss with the use of the cooling loss coefficient and the crank angle period from the start crank angle, at which the adiabatic process starts, to the predetermined crank angle.

According to this configuration, the cooling loss coefficient that determines the correlation between the cooling loss and the crank angles is calculated based on the water temperature and the engine speed. Thus, according to the invention, it is possible to highly accurately determine the cooling loss at the predetermined crank angle with the use of the cooling loss coefficient and the crank angle period from the start crank angle, at which the adiabatic process starts, to the predetermined crank angle.

In the above first aspect, the heat generation amount error calculation section may include: a correction coefficient calculation section that calculates a correction coefficient that determines the correlation between the heat generation amount and the crank angles with the use of the heat generation amount at at least two points in the adiabatic process; an estimation section that estimates a cylinder pressure error at a start crank angle, at which the adiabatic process starts, based on the correction coefficient; and a correction section that corrects the correction coefficient by making the correction coefficient reflect the cylinder pressure error. The heat generation amount error calculation section may calculate the heat generation amount error with the use of the crank angle period from the start crank angle to the predetermined crank angle and the correction coefficient that has been corrected by the correction section.

Depending on the amount of heat received by the cylinder pressure sensor, it is conceivable that an error due to the thermal strain occurs before completion of combustion. According to the above configuration, the cylinder pressure error at the start crank angle is estimated with the use of the correction coefficient that is correlated with the amount of heat received. Thus, according to the invention, by making the correction coefficient reflect the cylinder pressure error, it is possible to accurately determine the correlation between crank angles and the heat generation amount in the adiabatic process and therefore, it is possible to increase the accuracy in calculating the heat generation amount error.

In the above first aspect, the cylinder pressure sensor may have a characteristic that the cylinder pressure error in the adiabatic process is negative and increases in absolute value, and the start crank angle may be the crank angle, at which the heat generation amount peaks.

According to this configuration, the error due to the thermal strain that is superimposed on the detection value of the cylinder pressure sensor is negative in the adiabatic process and increases in absolute value. Thus, according to the invention, the heat generation amount decreases in the adiabatic process and therefore, it is possible to determine the crank angle, at which the heat generation amount peaks, as the start crank angle, at which the adiabatic process starts.

A second aspect of the invention is an internal combustion engine controller characterized by including: a cylinder pressure sensor that detects a cylinder pressure at a predetermined crank angle of an internal combustion engine; a heat generation amount calculation section that, with the use of the cylinder pressure detected by the cylinder pressure sensor, a cylinder volume when the cylinder pressure is detected, and a specific heat ratio of a gas in a cylinder, calculates a heat generation amount that is a product of the cylinder pressure and a value that is obtained by raising the cylinder volume to the power of the specific heat ratio; a start crank angle determination section that determines a start crank angle, at which an adiabatic process after combustion starts; and a heat generation amount estimation section that takes, as an estimate of the heat generation amount in the adiabatic process, the heat generation amount at the start crank angle that has been calculated by the heat generation amount calculation section.

The heat generation amount in the adiabatic process after combustion is theoretically constant. According to this configuration, the heat generation amount in the adiabatic process after combustion is estimated to be constant without any change from the heat generation amount at the start crank angle. Thus, according to the invention, it is possible to obtain the estimate of the heat generation amount with stability without being affected by the noise that is superimposed on the detection value of the cylinder pressure sensor in the adiabatic process.

In the above second aspect, the cylinder pressure sensor may have a characteristic that a cylinder pressure error in the adiabatic process is negative and increases in absolute value, and the start crank angle determination section may determine the crank angle, at which the heat generation amount peaks, as the start crank angle.

According to this configuration, the error due to the thermal strain that is superimposed on the detection value of the cylinder pressure sensor is negative in the adiabatic process and increases in absolute value. Thus, according to the invention, the heat generation amount decreases in the adiabatic process and therefore, it is possible to determine the crank angle, at which the heat generation amount peaks, as the start crank angle, at which the adiabatic process starts.

In the above second aspect, the internal combustion engine controller may further include a cooling loss calculation section that calculates a cooling loss of the heat generation amount at the predetermined crank angle in the adiabatic process; and a cooling loss elimination section that subtracts the cooling loss from the heat generation amount at the predetermined crank angle.

According to this configuration, the part of the heat generation amount corresponding to the cooling loss is subtracted from the heat generation amount. Thus, according to the invention, it is possible to highly accurately calculate the heat generation amount with the influence of the cooling loss taken into consideration.

In the above second aspect, the cooling loss calculation section may include a cooling loss coefficient calculation section that calculates a cooling loss coefficient that determines a correlation between the cooling loss and the crank angles based on a water temperature and an engine speed of the internal combustion engine. The cooling loss may be calculated with the use of a crank angle period from the start crank angle, at which the adiabatic process starts, to the predetermined crank angle, and the cooling loss coefficient.

According to this configuration, the cooling loss coefficient that determines the correlation between the cooling loss and the crank angles is calculated based on the water temperature and the engine speed. Thus, according to the invention, it is possible to highly accurately determine the cooling loss at the predetermined crank angle with the use of the cooling loss coefficient and the crank angle period from the start crank angle, at which the adiabatic process starts, to the predetermined crank angle.

A third aspect of the invention is a method of controlling an internal combustion engine equipped with a cylinder pressure sensor that detects a cylinder pressure at a predetermined crank angle, characterized by including: with the use of the cylinder pressure detected by the cylinder pressure sensor, a cylinder volume when the cylinder pressure is detected, and a specific heat ratio of a gas in a cylinder, calculating a heat generation amount that is a product of the cylinder pressure and a value that is obtained by raising the cylinder volume to the power of the specific heat ratio; and with the use of a correlation between the heat generation amount in an adiabatic process after combustion and crank angles, calculating a heat generation amount error at the predetermined crank angle in the adiabatic process.

According to this method, because there is a certain correlation between crank angles and the amount of heat generated in the adiabatic process after combustion, it is possible to highly accurately calculate the heat generation amount error at the predetermined crank angle based on the correlation.

In the above third aspect, the method may further include calculating, as an actual heat generation amount, a value that is obtained by subtracting the heat generation amount error from the heat generation amount at the predetermined crank angle.

According to this method, because the heat generation amount error is superimposed on the heat generation amount in the adiabatic process after combustion, it is possible to highly accurately estimate the actual heat generation amount at the predetermined crank angle by subtracting the heat generation amount error from the heat generation amount.

In the above third aspect, the method may further include calculating an actual cylinder pressure at the predetermined crank angle based on the actual heat generation amount.

According to this method, the actual cylinder pressure at the predetermined crank angle is calculated based on the calculated actual heat generation amount. Thus, according to the invention, it is possible to highly accurately correct the errors in the output caused by the thermal strain of the cylinder pressure sensor.

In the above third aspect, in calculating the heat generation amount error, a correction coefficient that determines the correlation between the heat generation amount and the crank angles may be calculated with the use of the heat generation amount at at least two points in the adiabatic process, and the heat generation amount error may be calculated with the use of a crank angle period from a start crank angle, at which the adiabatic process starts, to the predetermined crank angle, and the correction coefficient.

According to this method, the correction coefficient that determines the correlation between crank angles and the heat generation amount in the adiabatic process after combustion is calculated. The heat generation amount is theoretically constant in the adiabatic, process after combustion. Thus, according to the invention, it is possible to accurately calculate the heat generation amount error at the predetermined crank angle with the use of the correction coefficient and the crank angle period from the start crank angle, at which the adiabatic process starts, to the predetermined crank angle.

In the above third aspect, the start crank angle may be the crank angle, at which the heat generation amount peaks.

According to this method, the crank angle, at which the heat generation amount peaks, is determined as the start crank angle, at which the adiabatic process starts. Thus, according to the invention, it is possible to determine the start crank angle by a simple method.

In the above third aspect, the start crank angle may be the crank angle corresponding to the intersection of a straight line that approximates the variation of mass fraction of burned fuel (MFB) in a combustion process and a straight line that approximates the variation of MFB in an adiabatic expansion process subsequent to the combustion process.

According to this method, it is possible to accurately calculate the start crank angle even in the case where the heat generation amount does not have the maximum value.

In the above third aspect, the method may further include: calculating a cooling loss of the heat generation amount at the predetermined crank angle in the adiabatic process; and subtracting the cooling loss from the actual heat generation amount at the predetermined crank angle.

According to this method, the cooling loss of the heat generation amount is subtracted from the actual heat generation amount. Thus, according to the invention, it is possible to highly accurately calculate the actual heat generation amount with the influence of the cooling loss taken into consideration.

In the above third aspect, in calculating the cooling loss, a cooling loss coefficient that determines a correlation between the cooling loss and the crank angles may be calculated based on a water temperature and an engine speed of the internal combustion engine, and the cooling loss may be calculated with the use of the cooling loss coefficient and the crank angle period from the start crank angle, at which the adiabatic process starts, to the predetermined crank angle.

According to this method, the cooling loss coefficient that determines the correlation between the cooling loss and the crank angles is calculated based on the water temperature and the engine speed. Thus, according to the invention, it is possible to highly accurately determine the cooling loss at the predetermined crank angle with the use of the cooling loss coefficient and the crank angle period from the start crank angle, at which the adiabatic process starts, to the predetermined crank angle.

In the above third aspect, in calculating the heat generation amount error, a correction coefficient that determines the correlation between the heat generation amount and the crank angles may be calculated with the use of the heat generation amount at at least two points in the adiabatic process, a cylinder pressure error at a start crank angle, at which the adiabatic process starts, may be estimated based on the correction coefficient, the correction coefficient may be corrected by making the correction coefficient reflect the cylinder pressure error, and the heat generation amount error may be calculated with the use of the crank angle period from the start crank angle to the predetermined crank angle and the correction coefficient that has been corrected.

Depending on the amount of heat received by the cylinder pressure sensor, it is conceivable that an error due to the thermal strain occurs before completion of combustion. According to the above configuration, the cylinder pressure error at the start crank angle is estimated with the use of the correction coefficient that is correlated with the amount of heat received. Thus, according to the invention, by making the correction coefficient reflect the cylinder pressure error, it is possible to accurately determine the correlation between crank angles and the heat generation amount in the adiabatic process and therefore, it is possible to increase the accuracy in calculating the heat generation amount error.

In the above third aspect, the cylinder pressure sensor may have a characteristic that the cylinder pressure error in the adiabatic process is negative and increases in absolute value, and the start crank angle may be the crank angle, at which the heat generation amount peaks.

According to this method, the error due to the thermal strain that is superimposed on the detection value of the cylinder pressure sensor is negative in the adiabatic process and increases in absolute value. Thus, according to the invention, the heat generation amount decreases in the adiabatic process and therefore, it is possible to determine the crank angle, at which the heat generation amount peaks, as the start crank angle, at which the adiabatic process starts.

A fourth aspect of the invention is a method of an internal combustion engine equipped with a cylinder pressure sensor that detects a cylinder pressure at a predetermined crank angle, characterized by including: with the use of the cylinder pressure detected by the cylinder pressure sensor, a cylinder volume when the cylinder pressure is detected, and a specific heat ratio of a gas in a cylinder, calculating a heat generation amount that is a product of the cylinder pressure and a value that is obtained by raising the cylinder volume to the power of the specific heat ratio; determining a start crank angle, at which an adiabatic process after combustion starts; and taking the heat generation amount at the start crank angle as an estimate of the heat generation amount in the adiabatic process.

The heat generation amount in the adiabatic process after combustion is theoretically constant. According to this method, the heat generation amount in the adiabatic process after combustion is estimated to be constant without any change from the heat generation amount at the start crank angle. Thus, according to the invention, it is possible to obtain the estimate of the heat generation amount with stability without being affected by the noise that is superimposed on the detection value of the cylinder pressure sensor in the adiabatic process.

In the above fourth aspect, the cylinder pressure sensor may have a characteristic that a cylinder pressure error in the adiabatic process is negative and increases in absolute value; and the crank angle, at which the heat generation amount peaks, may be determined as the start crank angle.

According to this method, the error due to the thermal strain that is superimposed on the detection value of the cylinder pressure sensor is negative in the adiabatic process and increases in absolute value. Thus, according to the invention, the heat generation amount decreases in the adiabatic process and therefore, it is possible to determine the crank angle, at which the heat generation amount peaks, as the start crank angle, at which the adiabatic process starts.

In the above fourth aspect, the method may further include: calculating a cooling loss of the heat generation amount at the predetermined crank angle in the adiabatic process; and subtracting the cooling loss from the heat generation amount at the predetermined crank angle.

According to this method, the part of the heat generation amount corresponding to the cooling loss is subtracted from the heat generation amount. Thus, according to the invention, it is possible to highly accurately calculate the heat generation amount with the influence of the cooling loss taken into consideration.

In the above fourth aspect, in calculating the cooling loss, a cooling loss coefficient that determines a correlation between the cooling loss and the crank angles may be calculated based on a water temperature and an engine speed of the internal combustion engine, and the cooling loss may be calculated with the use of a crank angle period from the start crank angle, at which the adiabatic process starts, to the predetermined crank angle, and the cooling loss coefficient.

According to this method, the cooling loss coefficient that determines the correlation between the cooling loss and the crank angles is calculated based on the water temperature and the engine speed. Thus, according to the invention, it is possible to highly accurately determine the cooling loss at the predetermined crank angle with the use of the cooling loss coefficient and the crank angle period from the start crank angle, at which the adiabatic process starts, to the predetermined crank angle.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 4A shows the variation of cylinder pressure with crank angle, FIG. 4B shows the variation of heat generation amount $PV^\kappa$ with crank angle, and FIG. 4C shows the variation of MFB with crank angle;

DETAILED DESCRIPTION OF EMBODIMENTS

Figure 1:
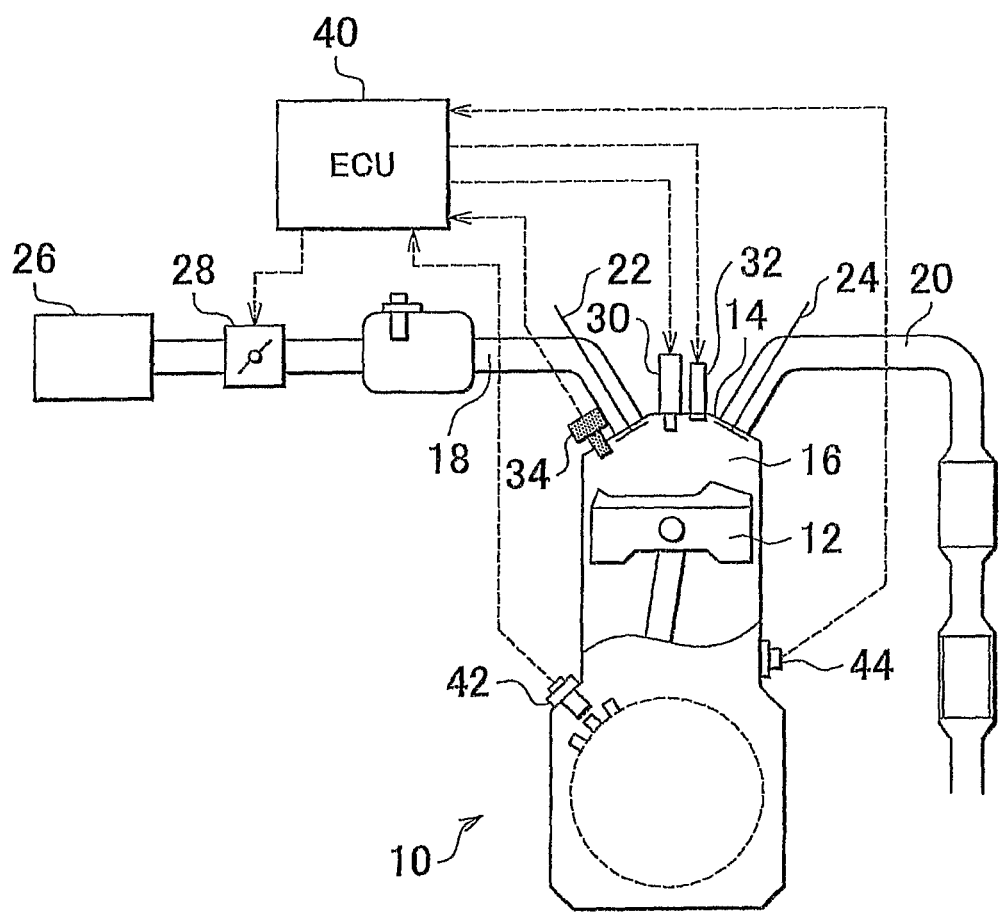
FIG. 1 shows a schematic configuration diagram for explaining a system configuration of a first embodiment of the invention.

Several embodiments of the invention will be described below with reference to drawings. The same components in the drawings are designated by the same reference numeral and the redundant description thereof is omitted. Note that the invention is not limited to the following embodiments.

First Embodiment

FIG. 1 shows a schematic configuration diagram for explaining a system configuration of a first embodiment of the invention. As shown in FIG. 1, the system of this embodiment is provided with an internal combustion engine 10. The internal combustion engine 10 is a spark-ignited engine that uses gasoline as fuel. In the cylinder of the internal combustion engine 10, a piston 12 that reciprocates within the cylinder is provided. The internal combustion engine 10 also includes a cylinder head 14. A combustion chamber 16 is formed between the piston 12 and the cylinder head 14. One end of an intake passage 18 and one end of an exhaust passage 20 are connected to the combustion chamber 16. An intake valve 22 and an exhaust valve 24 are provided at the connection portions between the combustion chamber 16, and the intake passage 18 and the exhaust passage 20, respectively.

An air cleaner 26 is installed at the inlet of the intake passage 18. A throttle valve 28 is placed downstream of the air cleaner 26. The throttle valve 28 is an electronically controlled valve that is driven by a throttle motor based on the degree of operation of the accelerator.

A spark plug 30 is fixed to the cylinder head 14 so as to protrude from the top portion of the combustion chamber 16 into the combustion chamber 16. A fuel injection valve 32 for injecting fuel into the cylinder is provided in the cylinder head 14. In addition, a cylinder pressure sensor 34 for detecting the cylinder pressure is built in the cylinder head 14.

As shown in FIG. 1, the system of this embodiment includes an electronic control unit (ECU) 40. Connected to the input of the ECU 40 are various sensors, such as a crank angle sensor 42 for detecting the rotational position of the crankshaft, and a water temperature sensor 44 for detecting the temperature of water, in addition to the cylinder pressure sensor 34 described above. In addition, connected to the output of the ECU 40 are various actuators, such as the throttle valve 28, the spark plug 30, and the fuel injection valve 32 described above. The ECU 40 controls the operation of the internal combustion engine 10 based on the various pieces of information input.

Configuration of Cylinder Pressure Sensor

Figure 2:
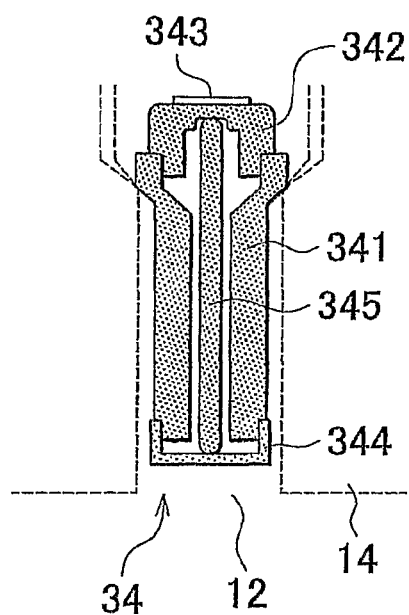
FIG. 2 shows a sectional view schematically showing a main portion of a cylinder pressure sensor 34.

Next, a specific configuration of the main portion of the cylinder pressure sensor 34 will be described. FIG. 2 shows a sectional view schematically showing a main portion of the cylinder pressure sensor 34. As shown in FIG. 2, the cylinder pressure sensor 34 includes a housing 341. The housing 341 has a hollow cylindrical structure and a housing 342 is joined to one end of the housing 341. A strain gauge element 343, of which the voltage value varies according to the pressure, is fixed to the housing 342.

A pressure receiving diaphragm 344 is fixed to the other end of the housing 341. The pressure receiving diaphragm 344 becomes a portion that is exposed to the gas in the combustion chamber 16 when the cylinder pressure sensor 34 is fixed to the cylinder head 14. A transmission rod 345 for transmitting the pressure received by the pressure receiving diaphragm 344 to the strain gauge element 343 is housed in the internal space within the housing 341. A preload is always applied to the strain gauge element 343 and the pressure receiving diaphragm 344 by the transmission rod 345.

Operation of First Embodiment

Output from Cylinder Pressure Sensor

The cylinder pressure sensor 34 is very useful in that it directly senses the combustion conditions in the cylinder. Thus, the output from the cylinder pressure sensor 34 is used in various control operations. For example, the detected cylinder pressure P is used in calculating the energy of the exhaust gas, the variation of the indicated torque, etc. Thus, the accuracy in detecting the cylinder pressure P significantly influences the catalyst warm-up control, the torque demand control, etc. that use these parameters. In addition, the mass fraction of burned fuel (MFB) and the heat generation amount $PV^\kappa$ (V is the cylinder volume and κ is the specific heat ratio of the gas in the cylinder) to be calculated using the detected cylinder pressure P, are calculated. These values are used in detecting misfires, performing optimum ignition timing control, etc.

Thermal Strain of Cylinder Pressure Sensor

Figure 3:
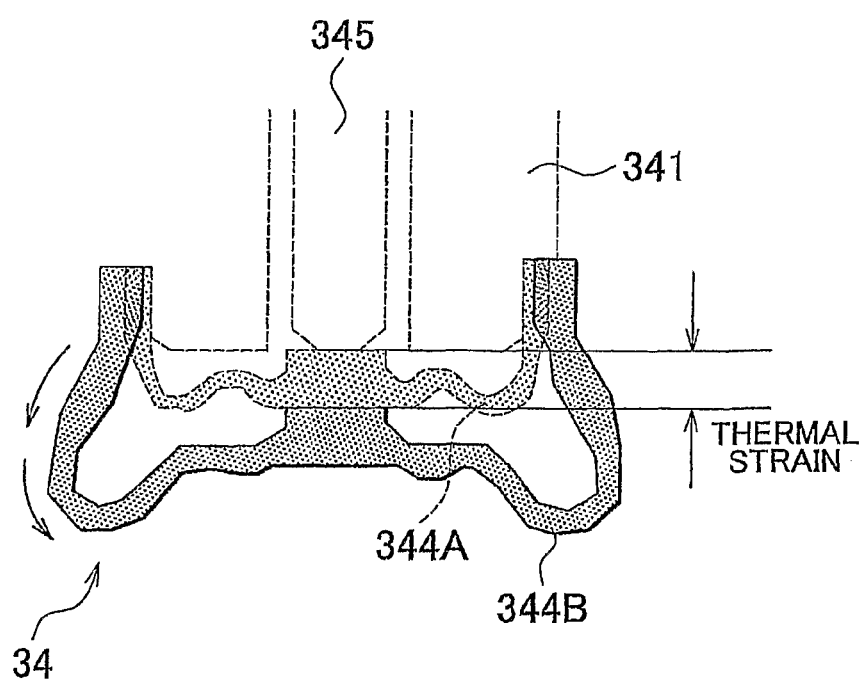
FIG. 3 is a diagram for explaining a situation where a thermal strain of the cylinder pressure sensor 34 occurs.

Next, the thermal strain of the cylinder pressure sensor 34 will be described. As described above, the pressure receiving diaphragm 344 of the cylinder pressure sensor 34 is exposed to the combustion chamber 16. Thus, there is a fear that the deformation of the pressure receiving diaphragm 344 (hereinafter referred to as the "thermal strain") occurs due to the exposure to the high-temperature burned gas (combustion fire) in the combustion chamber 16. FIG. 3 is a diagram for explaining the situation where a thermal strain of the cylinder pressure sensor 34 occurs. As shown in FIG. 3, when a thermal strain of the pressure receiving diaphragm 344 occurs, the form of the pressure receiving diaphragm 344 varies from the form indicated at 344A to the form indicated at 344B, and the amount of displacement of the transmission rod 345 is reduced. Thus, when the thermal strain of the cylinder pressure sensor 34 occurs, there is a fear that the output value of the cylinder pressure sensor 34 becomes less than the output value that corresponds to the actual pressure.

Figure 4A:
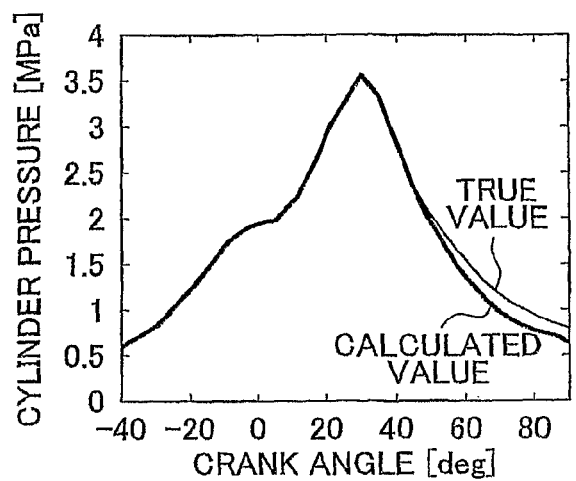
FIGS. 4A to 4C are diagrams showing the relation between various output values and true values of the output values when the thermal strain of the cylinder pressure sensor 34 occurs, where
Figure 4B:
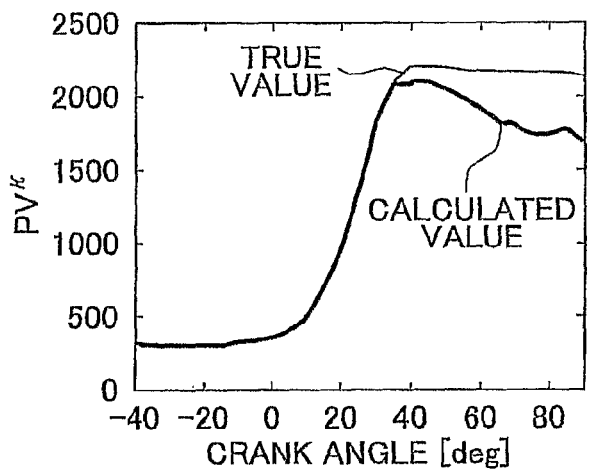
Figure 4C:
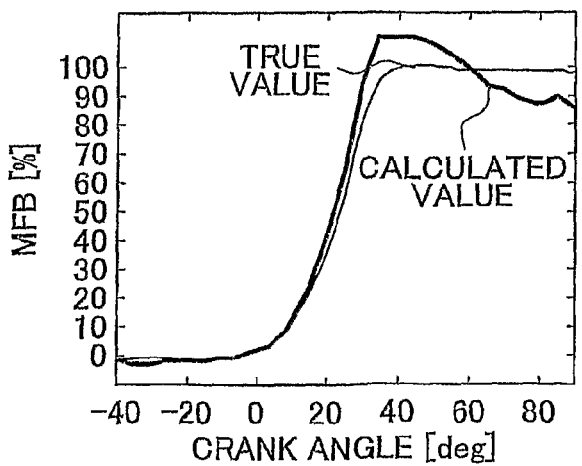

FIGS. 4A to 4C are diagrams showing the relation between various output values and the true values of the output values when the thermal strain of the cylinder pressure sensor 34 occurs. FIG. 4A shows the variation of cylinder pressure with crank angle. FIG. 4B shows the variation of $PV^\kappa$ (heat generation amount) with crank angle. FIG. 4C shows the variation of MFB with crank angle.

As shown in FIG. 4A, when the thermal strain of the cylinder pressure sensor 34 occurs, the cylinder pressure detected by the cylinder pressure sensor 34 deviates from the true value to the lower side. As shown in FIG. 4B, the output value deviation from the true value of $PV^\kappa$ occurs in the adiabatic process after completion of combustion. This is because the pressure receiving diaphragm 344 that is exposed to the high-temperature burned gas deforms in the adiabatic process after completion of combustion.

As shown in FIG. 4C, when the thermal strain of the cylinder pressure sensor 34 occurs, the MFB also significantly deviates from the true value. As described above, the MFB is used in various control operations, such as the optimum ignition timing control, the EGR control, etc. Thus, when these control operations are performed using inaccurate MFB, there is a fear that problems are caused, such as deterioration of emission, deterioration of fuel economy, etc.

Figure 5:
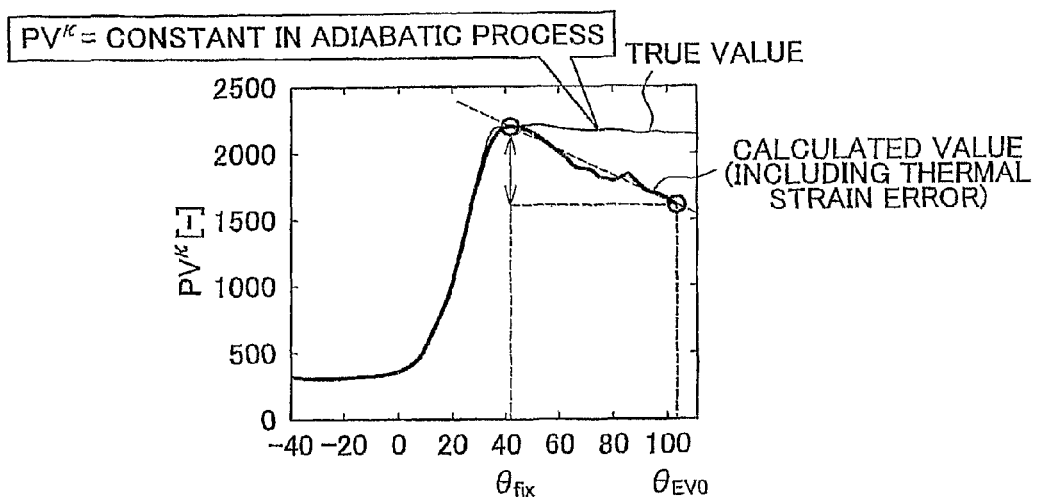
FIG. 5 is a diagram for explaining the relation between the calculated value of $PV^\kappa$ and the true value thereof.

In the system of this embodiment, the error caused by the thermal strain of the cylinder pressure sensor 34 (hereinafter also referred to as the "thermal strain error") is corrected by the following method. FIG. 5 is a diagram for explaining the relation between the calculated value of $PK^\kappa$ and the true value thereof. As shown in FIG. 5, there is no influence of the heat of combustion fire until the crank angle $\theta_{fix}$, at which the adiabatic process after combustion starts. Thus, when the crank angle, at which the intake valve is closed, is $\theta_{IVC}$, the corrected cylinder pressure $P_{fix}(\theta)$ at crank angle $\theta$ within the range of $\theta_{IVC} \leq \theta \leq \theta_{fix}$ is expressed by the following equation (1).

$$P_{fix}(\theta)=P(\theta) \quad (1)$$

The above equation (1) implies that correction of the error due to the thermal strain is not made during the crank angle period of $\theta_{IVC} \leq \theta \leq \theta_{fix}$.

Meanwhile, as shown in FIG. 5, at the crank angles after $\theta_{fix}$, the true value is almost constant, whereas the calculated value decreases. This is because, in the adiabatic process after completion of combustion, the value of $PV^\kappa$ is theoretically constant, but on the other hand, the calculated value is affected by the influence of the heat of combustion fire. As shown in FIG. 5, the calculated value after $\theta_{fix}$ linearly decreases. This is because the response of thermal expansion of the pressure receiving diaphragm 344 is slower than the variation of pressure in the cylinder due to combustion.

Thus, it is possible to approximate the trend of the thermal strain error by a straight line at the crank angles after $\theta_{fix}$. For this reason, in the system of this embodiment, the thermal strain error is estimated based on the inclination $K_{fix}$ (correction coefficient) of the straight line to correct the calculation value after the crank angle $\theta_{fix}$. Specifically, when the crank angle, at which the exhaust valve is opened, is $\theta_{EVO}$, the correction coefficient $K_{fix}$ is calculated by the following equation:

$$K_{fix}=\{PV^\kappa(\theta_{EVO})-PV^\kappa(\theta_{fix})\}/(\theta_{EVO}-\theta_{fix}) \quad (2)$$

The correction coefficient $K_{fix}$ in the above equation (2) represents the slope of the straight line connecting the two points of the calculated value $PV^\kappa(\theta_{fix})$ at the crank angle $\theta_{fix}$ and the calculated value $PV^\kappa(\theta_{EVO})$ at the crank angle $\theta_{EVO}$. As described above, the true value of $PV^\kappa(\theta)$ at the crank angles after $\theta_{fix}$ is almost constant. Thus, the thermal strain error $\Delta PV^\kappa(\theta)$ at a crank angle $\theta$ is expressed by the following equation (3):

$$\Delta PV^\kappa(\theta)=K_{fix} \times (\theta-\theta_{fix}) \quad (3)$$

Thus, $PV^\kappa_{fix}(\theta)$, after correction, at a crank angle $\theta$ within the range of $\theta_{fix} \leq \theta \leq \theta_{EVO}$ is expressed by the following equation (4):

$$PV^\kappa_{fix}(\theta)=PV^\kappa(\theta)-\Delta PV^\kappa(\theta) \quad (4)$$

With the use of the above equation (4), the cylinder pressure $P_{fix}(\theta)$, after correction, at a crank angle $\theta$ within the range of $\theta_{fix} \leq \theta \leq \theta_{EVO}$ is expressed by the following equation (5):

$$P_{fix}(\theta)=PV^\kappa_{fix}(\theta)/V^\kappa(\theta) \quad (5)$$

Figure 6:
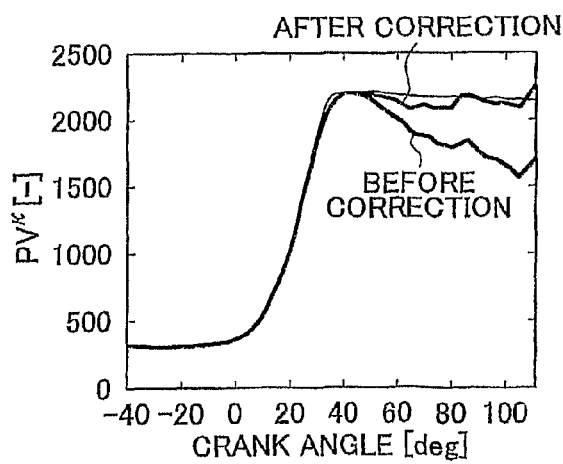
FIG. 6 is a diagram showing the value of $PV^\kappa$, of which the thermal strain error has been corrected.

FIG. 6 is a diagram showing the value of $PV^\kappa$, of which the thermal strain error has been corrected. It can be seen from FIG. 6 that the value of $PV^\kappa$ after correction is closer to the true value as compared to the value of $PV^\kappa$ before correction.

In this way, according to the system of this embodiment, it is possible to effectively correct the thermal strain error by simple calculation.

Specific Process of First Embodiment

Figure 7:
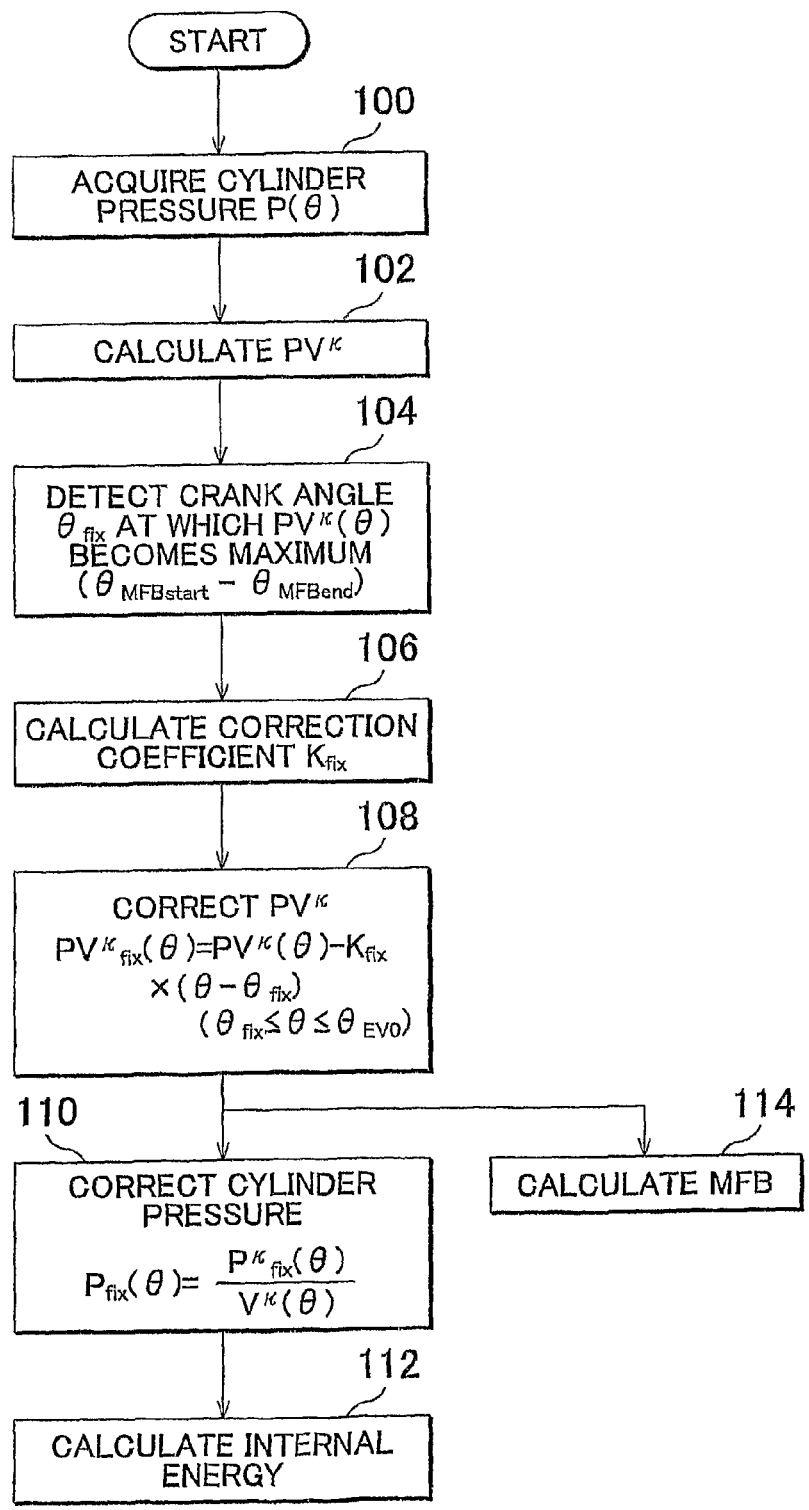
FIG. 7 is a flow chart showing a routine executed in the first embodiment of the invention.

Next, referring to FIG. 7, a specific process of the first embodiment will be described. FIG. 7 is a flow chart showing a routine, by which the ECU 40 corrects the thermal strain error.

In the routine shown in FIG. 7, first, a cylinder pressure is acquired (step 100). Specifically, in this step, the cylinder pressure $P(\theta)$ at a crank angle $\theta$ is detected with the use of the cylinder pressure sensor 34. Subsequently, the value of $PV^\kappa(\theta)$ is calculated (step 102). Specifically, in this step, the value of $PV^\kappa(\theta)$ at the crank angle $(\theta)$ is calculated based on the cylinder pressure $P(\theta)$ acquired in step 100, the cylinder volume $V(\theta)$ at the time of detecting the cylinder pressure, and the specific heat ratio $\kappa$ of the gas in the cylinder.

Next, the crank angle $\theta_{fix}$, at which the value of $PV^\kappa(\theta)$ peaks, is detected (step 104). Specifically, in this step, the crank angle $\theta_{fix}$, at which the value of $PV^\kappa(\theta)$ calculated in the above step 102 peaks, is detected within the period of detection of MFB ($\theta_{MFBstart}$ to $\theta_{MFBend}$). Then, the correction coefficient $K_{fix}$ is calculated (step 106). Specifically, in this step, the correction coefficient $K_{fix}$ is calculated by substituting the crank angle $\theta_{fix}$ detected in step 104 etc. into the above equation (2).

In the routine shown in FIG. 7, the value of $PV^\kappa_{fix}(\theta)$ (actual heat generation amount) after correction is then calculated (step 108). Specifically, in this step, the value of $PV^\kappa(\theta)$ at the crank angle $\theta$ within the predetermined range of $\theta_{fix} \leq \theta \leq \theta_{EVO}$ is corrected with the use of the above equation (4).

The actual heat generation amount $PV^\kappa_{fix}(\theta)$ is used in various calculations. In the routine shown in FIG. 7, the actual cylinder pressure $P_{fix}(\theta)$ is calculated with the use of this value of $PV^\kappa_{fix}(\theta)$ (step 110). Specifically, in this step, the value of $PV^\kappa_{fix}(\theta)$ that has been calculated with the use of the above equation (5) in the above step 108, is used to calculate the actual cylinder pressure $P_{fix}(\theta)$. In step 112, an accurate internal energy is calculated with the use of the cylinder pressure $P_{fix}(\theta)$ that has been calculated in step 110. In step 114, the MFB is calculated with the use of the value of $PV^\kappa_{fix}(\theta)$ that has been calculated in the above step 108.

As described above, according to the system of this embodiment, the thermal strain error superimposed on the value of $PV^\kappa(\theta)$ in the range of $\theta_{fix} \leq \theta \leq \theta_{EVO}$ is corrected by simple calculation. Thus, it is possible to keep the accuracy of the sensor at a high level without taking any measures against errors in the sensor in terms of hardware.

According to the system of this embodiment, it is possible to correct the error due to the thermal strain of the cylinder pressure sensor and it is therefore possible to accurately perform various control operations, such as the catalyst warm-up control, the misfire detection, the optimum ignition timing control, etc. that are based on the cylinder pressure.

In addition, according to the system of this embodiment, the optimum correction coefficient $K_{fix}$ is calculated every time the routine is executed, so that it is possible to deal with the errors caused by the individual differences of the cylinder pressure sensor 34, the secular change thereof, etc. with high accuracy.

While the correction coefficient $K_{fix}$ is calculated based on the above equation (2) in the embodiment described above, the method of calculating the correction coefficient $K_{fix}$ is not limited to this. Specifically, the method is not particularly limited as long as the slope of the approximate straight line of the value of $PV^\kappa(\theta)$ after the crank angle $\theta_{fix}$ is calculated.

While the crank angle, at which the value of $PV^\kappa(\theta)$ peaks, is determined as the crank angle $\theta_{fix}$, at which the thermal strain error starts being superimposed on the value of $PV^\kappa(\theta)$, the method of calculating the crank angle $\theta_{fix}$ is not limited to this. Specifically, it is conceivable that the thermal strain error that makes the calculated value greater than the true value occurs depending on the kind of the cylinder pressure sensor. In such a case, $\theta_{fix}$ cannot be determined as the crank angle, at which the value of $PV^\kappa(\theta)$ peaks. In such a case, for example, the crank angle $\theta_{fix}$ can be determined by the following method.

Figure 8:
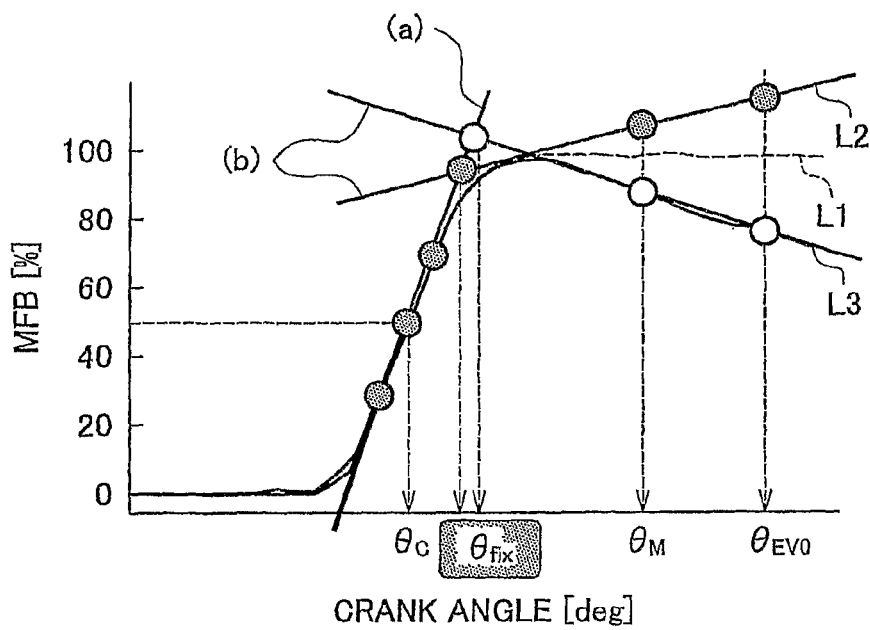
FIG. 8 is a diagram for explaining an example of a method of calculating the crank angle $\theta_{fix}$.

FIG. 8 is a diagram for explaining an example of a method of calculating the crank angle $\theta_{fix}$. In FIG. 8, the curve expressed by the dotted line L1 represents the variation of the MFB based on the true value of the cylinder pressure, the curve expressed by the solid line L2 represents the variation of the MFB when the cylinder pressure is higher than the true value because of the thermal strain error, and the curve expressed by the solid line L3 represents the variation of the MFB when the cylinder pressure is lower than the true value because of the thermal strain error.

As shown in FIG. 8, the straight line indicated at (a) is a straight line that approximates the variation of the MFB in the combustion process. Thus, when a crank angle on the straight line (a) is $\theta_c$ and $C_1$ is a constant, the straight line (a) is expressed by the following expression (6):

$$\{PV^\kappa(\theta_c+d\theta)-PV^\kappa(\theta_c-d\theta)\}/2d\theta\times\{\theta-(\theta_c-d\theta)\}+C_1 \quad (6)$$

On the other hand, the straight line indicated at (b) is a straight line that approximates the variation of the MFB during the adiabatic expansion process after combustion. Thus, when a crank angle on the straight line (b) is $\theta_M$ and $C_2$ is a constant, the straight line (b) is expressed by the following expression (7):

$$\{PV^\kappa(\theta_{EVO})-PV^\kappa(\theta_M)\}/(\theta_{EVO}-\theta_M)\}\times(\theta-\theta_M)+C_2 \quad (7)$$

As described above, the thermal strain occurs in the adiabatic process after completion of combustion. Thus, by calculating the crank angle at the intersection of the straight line (a) and the straight line (b) based on the above expressions (6) and (7), it is possible to determine the crank angle at the intersection as the crank angle $\theta_{fix}$, at which the adiabatic process after combustion starts. According to this method, it is possible to accurately calculate $\theta_{fix}$ even in the case where $PV^\kappa$ does not have the maximum value.

In the first embodiment described above, the value of $PV^\kappa$ may be regarded as the "heat generation amount" of the invention and the value of $\Delta PV^\kappa(\theta)$ may be regarded as the "heat generation amount error" of the invention. In addition, the "heat generation amount calculation section" of the invention is realized by the execution of the above step 102 by the ECU 40 and the "heat generation amount error calculation section" of the invention is realized by the execution of the above step 108 by the ECU 40.

In the first embodiment described above, $PV^\kappa_{fix}(\theta)$ may be regarded as the "actual heat generation amount" of the invention. In addition, the "actual heat generation amount calculation section" of the invention is realized by the execution of the above step 108 by the ECU 40.

In the first embodiment described above, $P_{fix}(\theta)$ may be regarded as the "actual cylinder pressure" of the invention. In addition, the "actual cylinder pressure calculation section" of the invention is realized by the execution of the above step 110 by the ECU 40.

In the first embodiment described above, the "correction coefficient calculation section" of the invention is realized by the execution of the above step 106 by the ECU 40.

Second Embodiment

Next, features of a second embodiment will be described with reference to FIGS. 9 to 11. The second embodiment is realized by the execution of the routine shown in FIG. 10 described later, using the hardware shown in FIG. 1.

In the system of the first embodiment described above, the thermal strain error is corrected on the assumption that the value of $PV^\kappa$ is substantially constant in the adiabatic process after combustion. When the internal combustion engine 10 is in the completely warmed-up condition and in normal operation, this assumption holds and therefore, it is possible to accurately correct the thermal strain error with the use of the system of the first embodiment described above. However, in the internal combustion engine 10, cooling loss occurs due to the low water temperature before the engine is warmed up, the low engine speed, etc. FIG. 9 is a diagram showing the influence of the cooling loss on the value of $PV^\kappa$. The curve indicated at L4 in FIG. 9 represents the variation of the value of $PV^\kappa$ (P is the true value) under the conditions that the engine speed is 2000 rpm and the water temperature is 86° C. The curve indicated at L5 in FIG. 9 represents the variation of the value of $PV^\kappa$ (P is the true value) under the conditions that the engine speed is 1000 rpm and the water temperature is 25° C.

Figure 9:
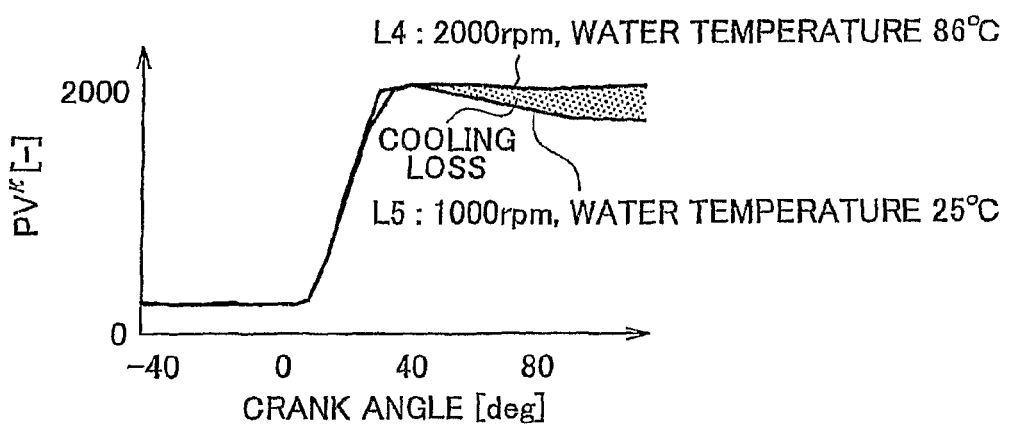
FIG. 9 is a diagram showing the influence of cooling loss on the value of $PV^\kappa$.

As shown in FIG. 9, with regard to the curve indicated at L5, a cooling loss occurs in the adiabatic process. The water temperature is proportional to the thermal energy that is absorbed by the wall of the cylinder. The engine speed is proportional to the amount of heat received by the cylinder pressure sensor per unit time. Thus, in the region in which there is the cooling loss, the value of $PV^\kappa$ linearly decreases as shown in FIG. 9. Thus, when the thermal strain error is corrected without taking account of the influence of the cooling loss under such operational conditions, an error is caused in the calculation of the MFB in the combustion stroke. As a result, there is a fear that the center of combustion shifts to the retard side and the retardation of ignition causes the fuel economy loss, the deterioration of performance, and the deterioration of drivability, etc.

Thus, in the second embodiment, the error due to the thermal strain and the error due to the cooling loss are separated and the error due to the thermal strain loss only is corrected. Specifically, first, the cooling loss coefficient $K_{cool}$ is determined based on the water temperature and the engine speed. The cooling loss coefficient $K_{cool}$ is a coefficient that represents the slope (reduction rate) of $PV^\kappa$ due to cooling loss. Thus, the correction coefficient $K_{fix}'(=K_{fix}-K_{cool})$ that is the difference between the correction coefficient $K_{fix}$ and the cooling loss coefficient $K_{cool}$ serves as the correction coefficient, in which the influence of the cooling loss is taken into consideration. Thus, by correcting the value of $PV^\kappa$ with the use of such a correction coefficient $K_{fix}'$, it is possible to correct the thermal strain error with the influence of the cooling loss taken into consideration.

Specific Process of Second Embodiment

Next, referring to FIG. 10, a specific process of the second embodiment will be described. FIG. 10 is a flow chart showing a routine, by which the ECU 40 corrects the thermal strain error.

Figure 10:
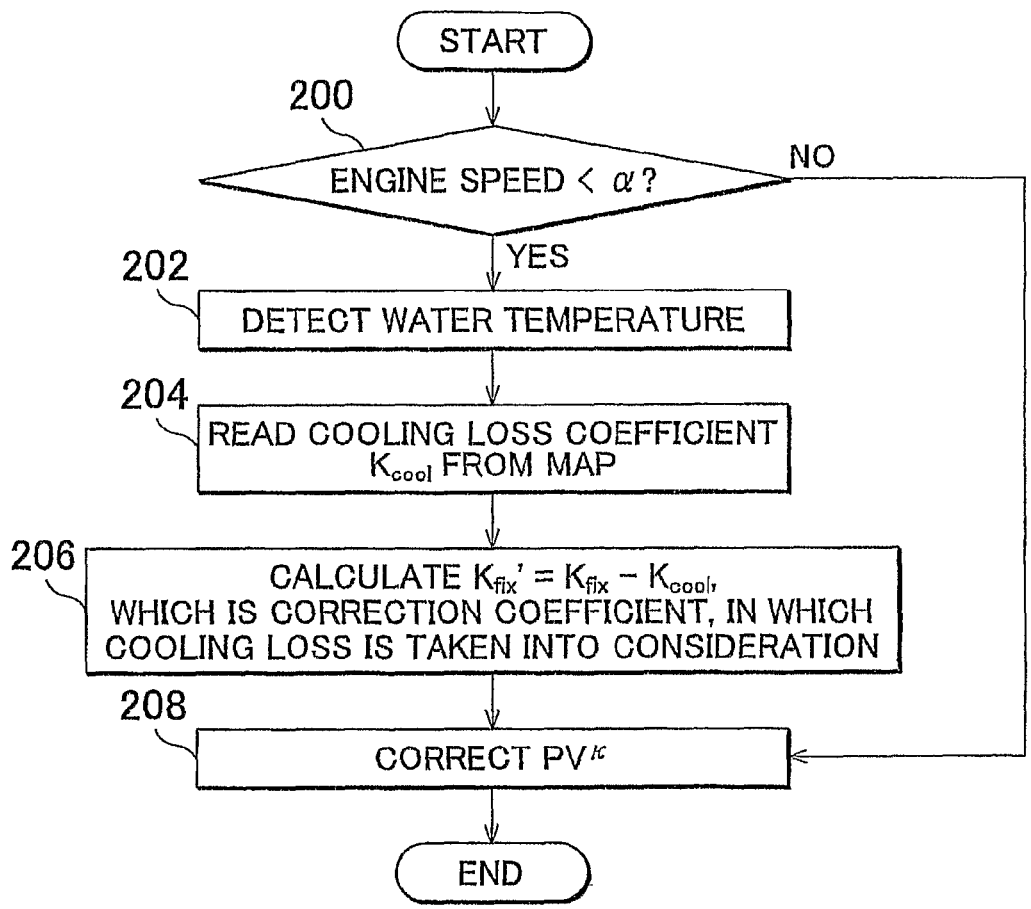
FIG. 10 is a flow chart showing a routine executed in a second embodiment of the invention.

In the routine shown in FIG. 10, it is determined whether the engine speed is lower than a predetermined value α (step 200). As the predetermined value α, a predetermined value is read in as the maximum engine speed, up to which the cooling loss of the internal combustion engine 10 can affect the calculation of $PV^\kappa$. As a result, when it is determined that the relation, (engine speed)<(predetermined value α), is satisfied, it is determined that the influence of the cooling loss is superimposed on the value of $PK^\kappa$. Then, the process proceeds to the next step and the water temperature of the internal combustion engine 10 is detected (step 202).

Next, the cooling loss coefficient $K_{cool}$ is read in from a map (step 204). FIG. 11 is a map for determining the cooling loss coefficient $K_{cool}$. In this step, the coefficient $K_{cool}$ corresponding to the engine speed and the water temperature that are detected in the above steps 200 and 202, respectively, is determined with the use of the map shown in FIG. 11. According to this map, the lower the engine speed is, the greater the value of the coefficient $K_{cool}$ is determined to be, while the lower the water temperature is, the greater the value of the coefficient $K_{cool}$ is determined to be.

Next, the correction coefficient $K_{fix}'$ is calculated (step 206). Specifically, in this step, first, the difference between the correction coefficient $K_{fix}$ that is calculated in the above step 106 and the cooling loss coefficient $K_{cool}$ that is read in the above step 206 is calculated as the correction coefficient $K_{fix}'$, in which the cooling loss is taken into consideration. The calculated correction coefficient $K_{fix}'$ replaces the correction coefficient $K_{fix}$.

After the above step 206, or when it is determined in the above-described step 200 that the relation, (engine speed)<(predetermined value α), is not satisfied, the process proceeds to the next step and the value of $PV^\kappa_{fix}(\theta)$ after correction is calculated (step 208). Specifically, in this step, the process similar to that of the above step 108 is executed.

As described above, according to the system of the second embodiment, it is possible to correct the thermal strain error with the influence of the cooling loss taken into consideration. Thus, it is possible to accurately correct the thermal strain error that is superimposed on the value of $PV^\kappa(\theta)$ independently of the operational conditions of the internal combustion engine 10.

Figure 11:
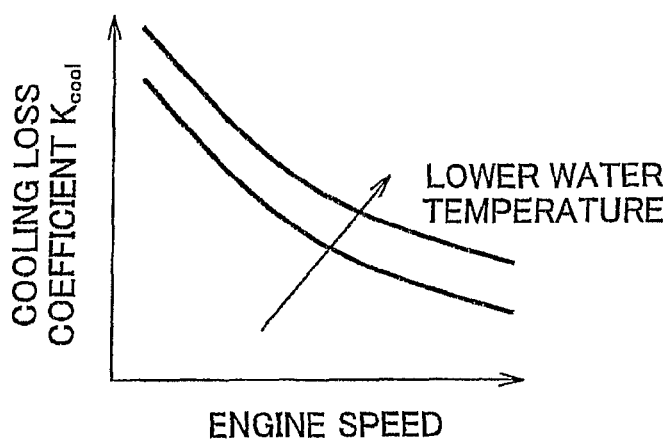
FIG. 11 is a map for determining a cooling loss coefficient $K_{cool}$.

In the second embodiment described above, the cooling loss coefficient $K_{cool}$ is determined with the use of the map shown in FIG. 11. However, the method of determining the cooling loss coefficient $K_{cool}$ is not limited to this. Specifically, the cooling loss coefficient $K_{cool}$ may be determined with the use of a multidimensional map, in which a plurality of parameters correlated with the cooling loss of the internal combustion engine 10 are used.

In the second embodiment described above, the value of $PV^\kappa_{fix}(\theta)$ after correction is calculated with the use of the correction coefficient $K_{fix}'(=K_{fix}-K_{cool})$, in which the cooling loss is taken into consideration. However, the method of correcting the thermal strain error, in which the cooling loss is taken into consideration, is not limited to this. Specifically, the part of the value of $PV^\kappa(\theta)$ corresponding to the cooling loss may be separately calculated with the use of the cooling loss coefficient $K_{cool}$, and the part corresponding to the cooling loss may be subtracted from the value of $PV^\kappa_{fix}(\theta)$ that is calculated with the use of the correction coefficient $K_{fix}$.

In the second embodiment described above, the "cooling loss elimination section" of the invention is realized by the execution of the above step 208 by the ECU 40.

In the second embodiment described above, the "cooling loss coefficient calculation section" of the invention is realized by the execution of the above step 204 by the ECU 40.

Third Embodiment

Next, features of a third embodiment will be described with reference to FIGS. 12 and 13. The third embodiment is realized by the execution of the routine shown in FIG. 13 described later, using the hardware shown in FIG. 1.

In the system of the first embodiment described above, the thermal strain error is corrected in the adiabatic process after combustion (see FIG. 6). The direct injection noise, the ignition noise, etc. of another cylinder can be superimposed on the cylinder pressure P. Thus, the more distant from the top dead center (TDC) the crank angle is, that is, the greater the cylinder volume V is, the greater the noise is that is amplified and superimposed, as an error factor, on the calculated value of $PV^\kappa$. The system of the first embodiment described above cannot correct the error caused by such noise.

Thus, in the system of the third embodiment, the error due to the thermal strain of the cylinder pressure sensor 34 and the error due to the above-described noise are corrected by the following method. FIG. 12 is a diagram for explaining the relation between the calculated value of $PV^\kappa$ and the true value thereof. As described in the description of the first embodiment, there is no thermal influence due to the combustion fire until the crank angle $\theta_{fix}$, at which the adiabatic process after combustion starts. Thus, the cylinder pressure $P_{fix}(\theta)$ after correction at the crank angle θ within the range of $\theta_{IVC} \leq \theta \leq \theta_{fix}$ is expressed by the above equation (1).

Figure 12:
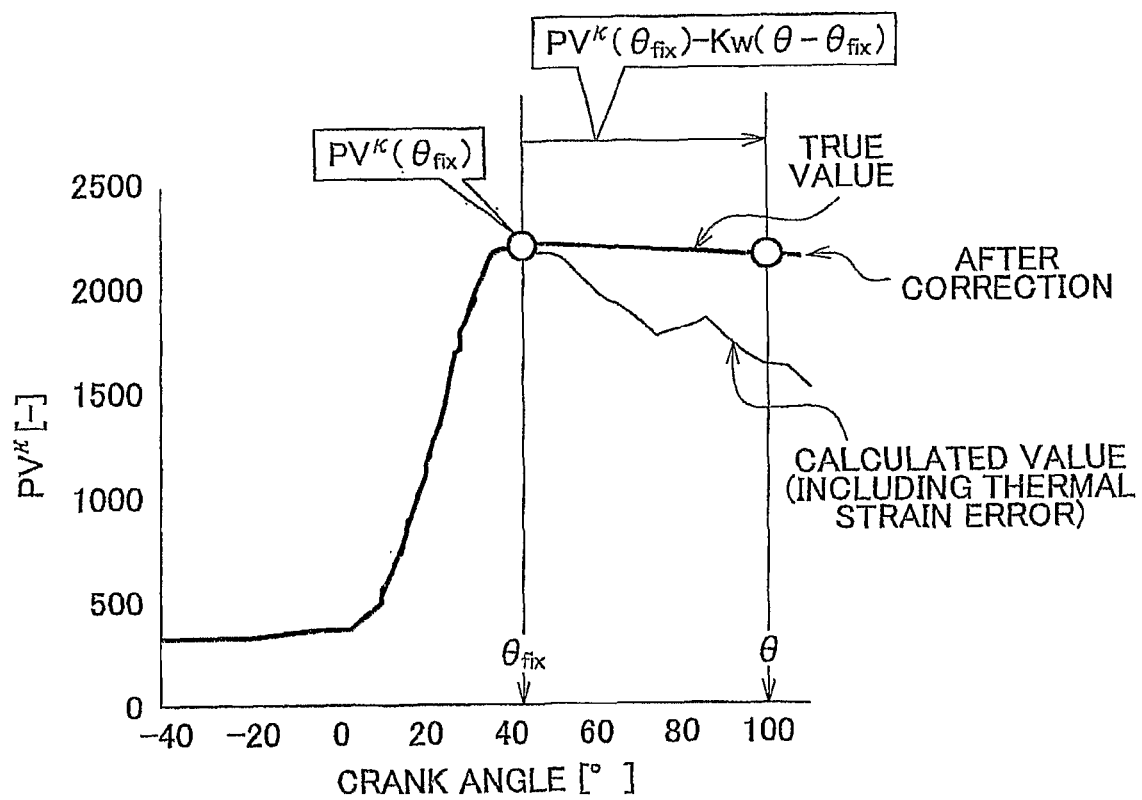
FIG. 12 is a diagram for explaining the relation between the calculated value of $PV^\kappa$ and the true value thereof.

On the other hand, at the crank angles after $\theta_{fix}$, as shown in FIG. 12, the true value shows a moderately downward straight line. This is because the influence of the cooling loss described above in the description of the second embodiment is superimposed on the value of $PV^\kappa$ that is theoretically constant. On the other hand, the calculated value rapidly decreases under the thermal influence due to combustion fire and the influence of noise.

In the third embodiment, the value that is obtained by making the calculated value $PK^\kappa(\theta_{fix})$ at the crank angle $\theta_{fix}$ reflect the effect of the cooling loss is taken as an estimate of the value of $PV^\kappa_{fix}(\theta)$ after correction at the crank angle θ within the range of $\theta_{fix} \leq \theta \leq \theta_{EVO}$. More specifically, the value of $PV^\kappa_{fix}(\theta)$ after correction at the crank angle θ within the range of $\theta_{fix} \leq \theta \leq \theta_{EVO}$ is expressed by the following equation (8).

$$PV^\kappa_{fix}(\theta) = PV^\kappa(\theta_{fix}) - Kw(\theta - \theta_{fix}) \qquad (8)$$

In this equation, Kw is a cooling loss coefficient that is determined based on the water temperature and the engine speed and that represents the rate of change of the value of $PV^\kappa$ due to the cooling loss. Thus, with the above equation (8), by correcting the calculated value $PV^\kappa(\theta_{fix})$ with the use of the correction coefficient Kw, it is possible to correct the error due to the thermal strain and the error due to noise with the influence of cooling loss taken into consideration.

Specific Process of Third Embodiment

Next, referring to FIG. 13, a specific process of this embodiment will be described. FIG. 13 is a flow chart showing a routine, by which the ECU 40 corrects the thermal strain error.

Figure 13:
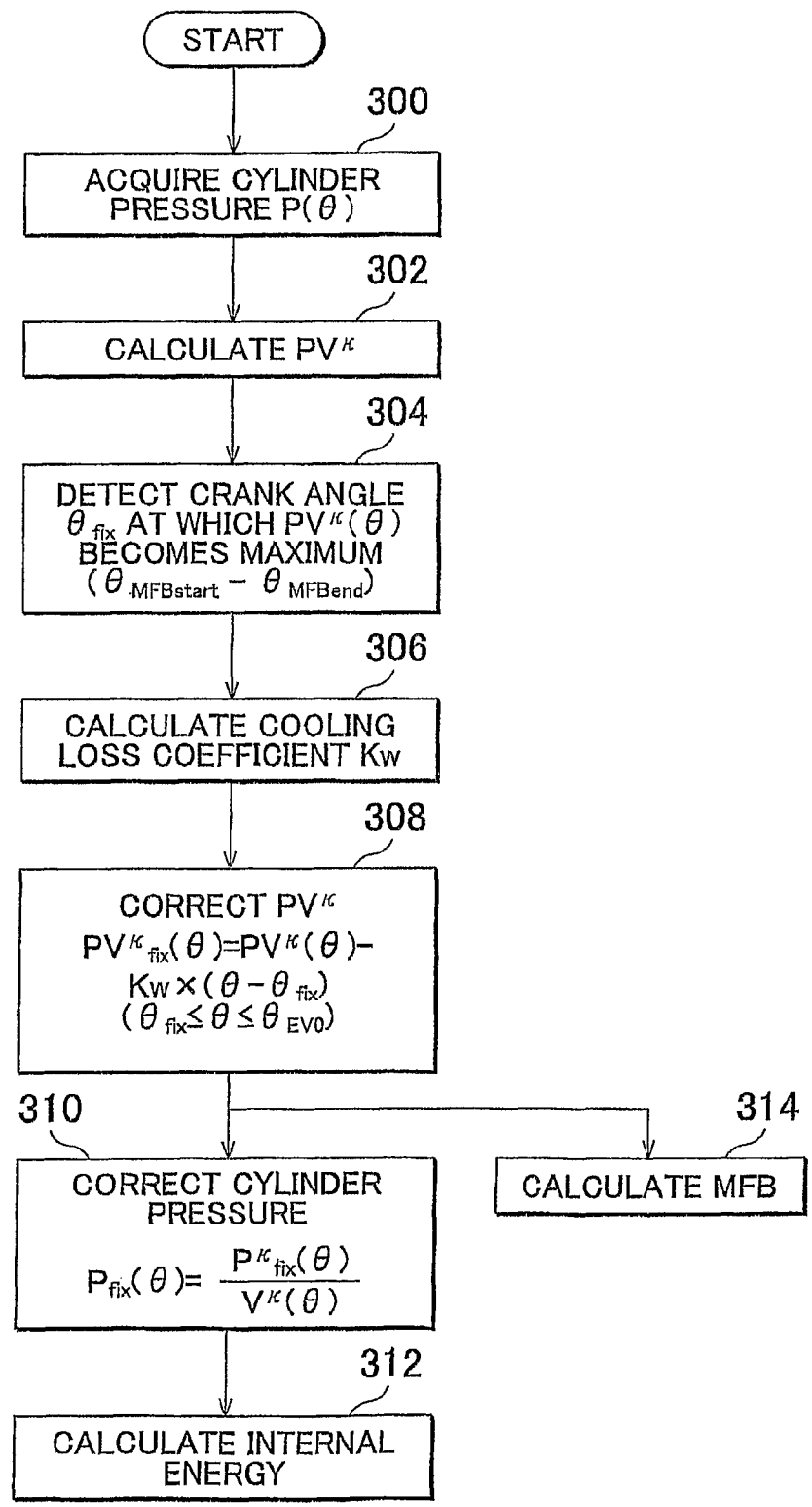
FIG. 13 is a flow chart showing a routine executed in a third embodiment of the invention.

In the routine shown in FIG. 13, first, a cylinder pressure P(θ) is acquired (step 300). Subsequently, the value of $PV^\kappa(\theta)$ is calculated (step 302). Next, the crank angle $\theta_{fix}$, at which the value of $PV^\kappa(\theta)$ peaks, is detected (step 304). Specifically, in these steps, the processes similar to those of the above steps 100 to 104 are performed.

Next, a cooling loss coefficient Kw is read in from a map (step 306). Specifically, in this step, first, the engine speed and the water temperature of the internal combustion engine 10 are detected. Next, Kw is determined that corresponds to the detected engine speed and water temperature with the use of a multidimensional map in which the engine speed and the water temperature are parameters. With this map, the lower the engine speed is, the greater the coefficient Kw is determined to be, and in addition, the lower the water temperature is, the greater the coefficient Kw is determined to be.

In the routine shown in FIG. 13, then, the value of $PV^\kappa_{fix}(\theta)$ (actual heat generation amount) after correction is calculated (step 308). Specifically, in this step, the value of $PV^\kappa(\theta)$ at the crank angle $\theta$ within the predetermined range of $\theta_{fix} \leq \theta \leq \theta_{EVO}$ is corrected with the use of the above equation (8).

The actual heat generation amount $PV^\kappa_{fix}(\theta)$ is used in various calculations. In the routine shown in FIG. 13, an actual cylinder pressure $P_{fix}(\theta)$ is calculated with the use of the value of $PV^\kappa_{fix}(\theta)$ (step 310). In step 312, an accurate internal energy is calculated with the use of the cylinder pressure $P_{fix}(\theta)$ calculated in the above step 310. In step 314; the MFB is calculated with the use of the value of $PV^\kappa_{fix}(\theta)$ calculated in the above step 308.

As described above, according to the system of this embodiment, it is possible to correct the error due to the thermal strain and the error due to noise, which are superimposed on the value of $PV^\kappa(\theta)$ within the range of $\theta_{fix} \leq \theta \leq \theta_{EVO}$, by simple calculation with the influence of the cooling loss taken into consideration. In this way, it is possible to keep the accuracy of the sensor at a high level without taking any measures against errors in the sensor in terms of hardware.

In the third embodiment described above, the cooling loss coefficient Kw is determined with the use of the engine speed and the water temperature. However, the method of determining the cooling loss coefficient Kw is not limited to this. Specifically, the cooling loss coefficient Kw may be determined with the use of a multidimensional map, in which a plurality of parameters correlated with the cooling loss of the internal combustion engine 10 are used.

In the above described third embodiment, the crank angle $\theta_{fix}$, at which the thermal strain error starts being superimposed on the value of $PV^\kappa(\theta)$, is determined as the crank angle, at which the value of $PV^\kappa(\theta)$ peaks. However, the method of calculating the crank angle $\theta_{fix}$ is not limited to this. Specifically, the crank angle $\theta_{fix}$ may be determined with the use of the method shown in FIG. 8 described above in the description of the first embodiment.

In the third embodiment described above, the value of $PV^\kappa$ may be regarded as the "heat generation amount" of the invention and the value of the crank angle $\theta_{fix}$ may be regarded as the "start crank angle" of the invention. In addition, the "heat generation amount estimation section" of the invention is realized by the execution of the above step 308 by the ECU 40.

In the third embodiment described above, the "cooling loss elimination section" of the invention is realized by the execution of the above step 308 by the ECU 40.

In the third embodiment described above, the "cooling loss coefficient calculation section" of the invention is realized by the execution of the above step 306 by the ECU 40.

Fourth Embodiment

Figure 14:
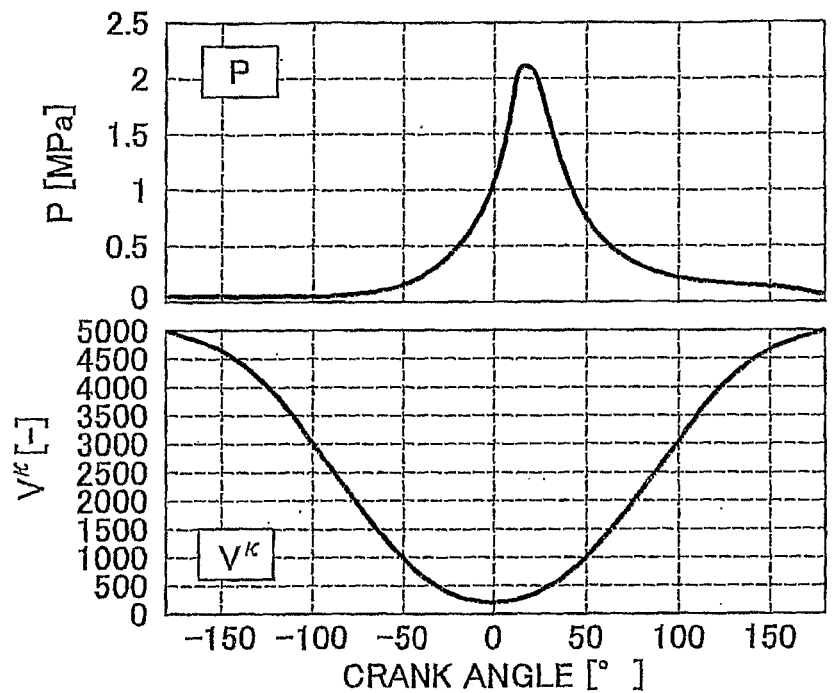
FIG. 14 is a diagram showing the variation of the cylinder pressure P, $V^\kappa$, and $PV^\kappa$ with crank angle.
Figure 14:
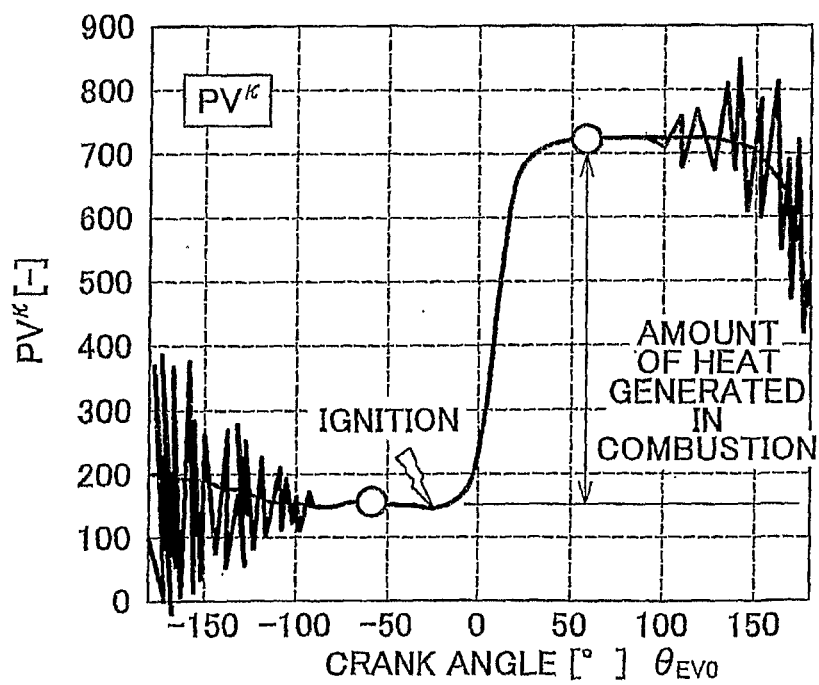

Next, referring to FIG. 14, features of a fourth embodiment will be described. In the system of the third embodiment described above, the method shown in FIG. 8 described above in the description of the first embodiment can be used to calculate the crank angle $\theta_{fix}$. With the use of this method, it is possible to determine the crank angle $\theta_{fix}$ independently of whether the thermal strain error is a positive value or a negative value, of which the absolute value increases.

In the method shown in FIG. 8, however, the error due to noise tends to be superimposed on the value of $PV^\kappa(\theta_{EVO})$ in the above expression (7). FIG. 14 is a diagram showing the variation of the cylinder pressure P, $V^\kappa$, and $PV^\kappa$ with crank angle. As shown in FIG. 14, the more distant from the TDC the crank angle is, that is, the greater the cylinder volume V is, the greater the noise is that is amplified and superimposed, as an error factor, on the value of $PV^\kappa$. Thus, when such an error is superimposed on the value of $PV^\kappa(\theta_{EVO})$, it is conceivable that the crank angle $\theta_{fix}$ cannot be accurately calculated.

Thus, in the system of the fourth embodiment, the cylinder pressure sensor 34 is used that is adjusted to have a thermal strain error characteristic such that the thermal strain error in the adiabatic process after combustion is always negative. According to such a cylinder pressure sensor 34, it is possible to always accurately determine the crank angle, at which the value of $PV^\kappa(\theta)$ peaks, as the crank angle $\theta_{fix}$.

Fifth Embodiment

Figure 15:
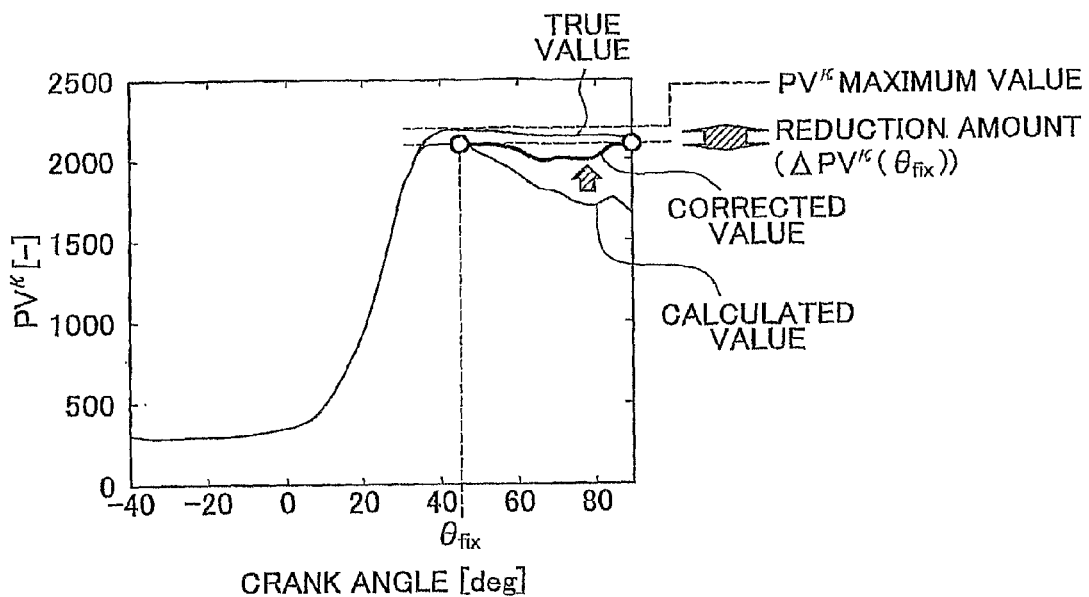
FIG. 15 is a diagram for explaining the relation between the calculated value of $PV^\kappa$ and the true value thereof.

Next, referring to FIGS. 15 to 17, features of a fifth embodiment will be described. The fifth embodiment is realized by the execution of the routine shown in FIG. 17 described later, using the hardware shown in FIG. 1.

In the first embodiment described above, the thermal strain error that occurs in the adiabatic process after combustion is corrected. However, depending on the amount of heat received by the cylinder pressure sensor 34, the thermal strain error may occur before the completion of combustion. FIG. 15 is a diagram for explaining the relation between the calculated value of $PV^\kappa$ and the true value thereof. As shown in FIG. 15, the start crank angle, at which the adiabatic process starts, that is, the crank angle $\theta_{fix}$, at which the value of $PV^\kappa(\theta)$ peaks, the value of $PV^\kappa(\theta_{fix})$ is lower than the true value. This is because the output value of the cylinder pressure sensor 34 is reduced due to the thermal strain. In such a case, as shown in FIG. 15, the value of $PV^\kappa(\theta)$ in the adiabatic process cannot be accurately corrected when the correction made by the system of the above-described first embodiment is made with the use of such a value of $PV^\kappa(\theta_{fix})$.

Thus, in the system of the fifth embodiment, the influence of the thermal strain error that is superimposed before the completion of combustion is also accurately corrected. More specifically, first, the cylinder pressure reduction amount $\Delta P$ is estimated, which is the cylinder pressure error at the crank angle $\theta_{fix}$.

For the sake of convenience of calculation, the value obtained by multiplying the correction coefficient $K_{fix}$ described above in the description of the first embodiment by a minus sign is defined as the correction amount K. By transforming the above equations (2), (3), and (4), the following equations (9) and (10) are derived:

$$K = \{PV^\kappa(\theta_{fix}) - PV^\kappa(\theta_{EVO})\}/(\theta_{EVO} - \theta_{fix}) \quad (9)$$

$$PV^\kappa_{fix}(\theta) = PV^\kappa(\theta) + (\theta - \theta_{fix}) \times K \quad (10)$$

The correction amount K increases as the amount of heat received by the cylinder pressure sensor 34 increases. In addition, the greater the amount of heat received by the cylinder pressure sensor 34 is, the greater the influence of the thermal strain exerted until the completion of combustion is. Thus, in the fifth embodiment, the relation between the correction amount K and ΔP is stored in the form of a map and ΔP corresponding to the correction amount K is determined based on the map.

Figure 16:
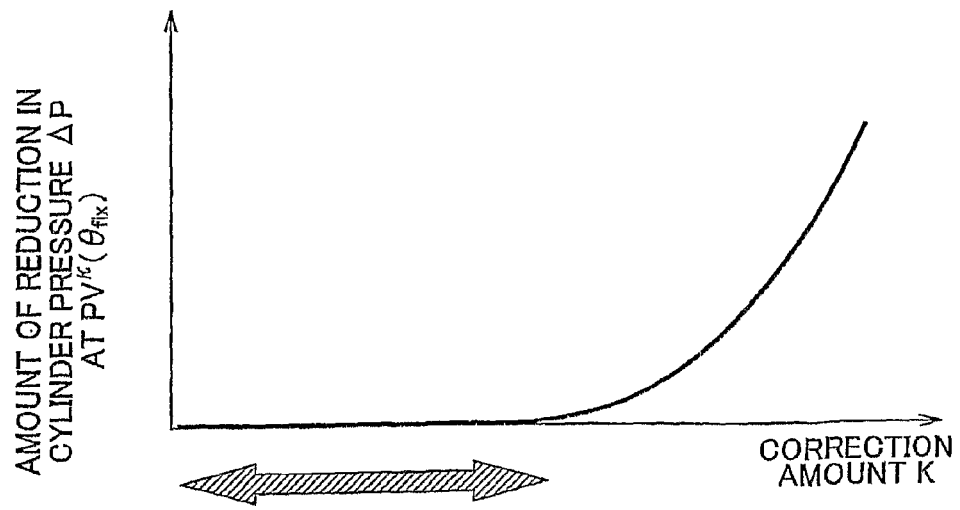
FIG. 16 is an example of the map that determines cylinder pressure reduction amount ΔP in relation to correction amount K.

FIG. 16 is an example of the map that determines the value of ΔP in relation to the correction amount K. According to this map, while the correction amount K is small, the amount of heat received is estimated to be small and therefore, the cylinder pressure error ΔP at the crank angle $\theta_{fix}$ is estimated to be substantially zero. On the other hand, when the correction amount K is large, it is estimated that the cylinder pressure error ΔP occurs according to the amount of heat received. In this way, with this map, it is possible to accurately estimate the cylinder pressure error ΔP based on the correction amount K.

It should be noted that the timing, at which the thermal strain error of the cylinder pressure sensor 34 starts to occur, is considered to be a first-order lag system that responds to heat transfer and therefore, it is considered that such an occurrence timing also depends on the engine speed. Thus, it is preferable that the map shown in FIG. 16 be a multidimensional map, in which the correction amount K and the engine speed are parameters. This makes it possible to more accurately estimate the cylinder pressure error ΔP.

Because the cylinder pressure reduction amount ΔP at the crank angle $\theta_{fix}$ is accurately estimated in this way, it is possible to calculate the actual heat generation amount $PV^{\kappa}_{fix}(\theta_{fix})$, from which the influence of the thermal strain error before completion of combustion has been eliminated. By substituting the value of $PV^{\kappa}_{fix}(\theta_{fix})$ into the $PV^{\kappa}(\theta_{fix})$ in the above equation (9) to recalculate the correction amount K and substituting the recalculated correction amount K into the above equation (10), an accurate value of $PV^{\kappa}_{fix}(\theta)$, from which the influence of the thermal strain error has been eliminated, is obtained.

Specific Process of Fifth Embodiment

Next, referring to FIG. 17, a specific process of this embodiment will be described. FIG. 17 is a flow chart showing a routine, by which the ECU 40 corrects the thermal strain error.

Figure 17:
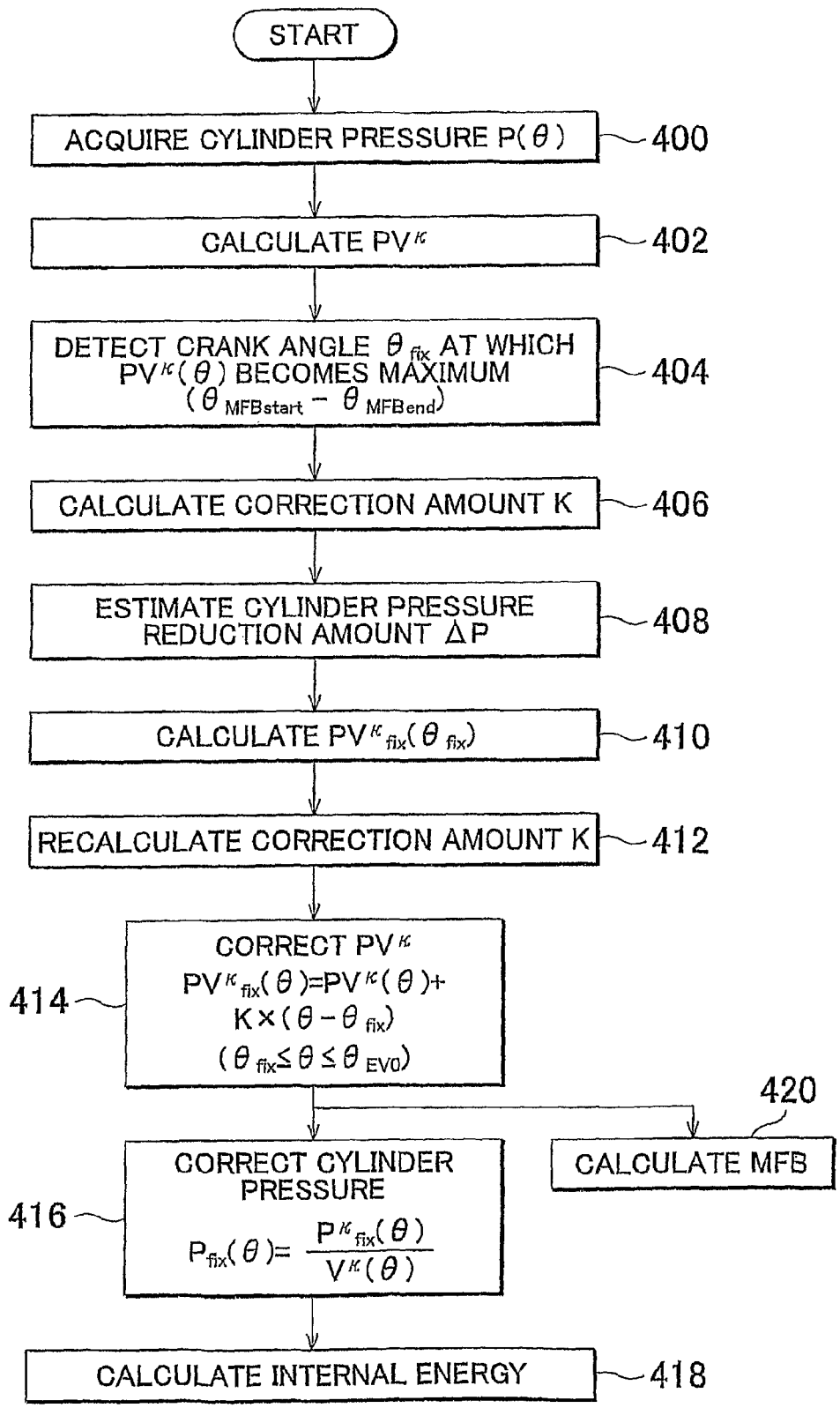
FIG. 17 is a flow chart showing a routine executed in a fifth embodiment of the invention.

In the routine shown in FIG. 17, first, a cylinder pressure P(θ) is acquired (step 400). Subsequently, the value of $PV^{\kappa}(\theta)$ is calculated (step 402). Next, the crank angle $\theta_{fix}$, at which the value of $PV^{\kappa}(\theta)$ peaks, is detected (step 404). Specifically, in these steps, the processes similar to those of the above steps 100 to 104 are performed.

Next, the correction coefficient K is calculated (step 406). Specifically, in this step, the correction coefficient K is calculated by substituting the crank angle $\theta_{fix}$ that has been detected in the above step 404, etc. into the above equation (9).

In the routine shown in FIG. 17, then, the cylinder pressure reduction amount ΔP at the crank angle $\theta_{fix}$ is estimated (step 408). The ECU 40 stores the map shown in FIG. 16 described above. Specifically, in this step, the cylinder pressure reduction amount ΔP that corresponds to the correction amount K calculated in the above step 406 is determined from this map.

Next, the actual heat generation amount $PV^{\kappa}_{fix}(\theta_{fix})$ at the crank angle $\theta_{fix}$ is calculated (step 410). Specifically, in this step, the actual heat generation amount $PV^{\kappa}_{fix}(\theta_{fix})$ is calculated by adding the value of $\Delta PV^{\kappa}(\theta_{fix})$ to the value of $PV^{\kappa}(\theta_{fix})$. Subsequently, the correction amount K is recalculated (step 412). Specifically, in this step, the actual heat generation amount $PV^{\kappa}_{fix}(\theta_{fix})$ that has been calculated in the above step 410 is substituted into $PV^{\kappa}(\theta_{fix})$ in the above equation (9).

In the routine shown in FIG. 17, the value of $PV^{\kappa}_{fix}(\theta)$ (actual heat generation amount) after correction is then calculated (step 414). Specifically, in this step, the value of $PV^{\kappa}(\theta)$ at the crank angle θ within the predetermined range of $\theta_{fix} \leq \theta \leq \theta_{EVO}$ is corrected by substituting the value of K recalculated in the above step 412 into the above equation (10).

The actual heat generation amount $PV^{\kappa}_{fix}(\theta)$ is used in various calculations. In the routine shown in FIG. 17, the actual cylinder pressure $P_{fix}(\theta)$ is calculated with the use of this value of $PV^{\kappa}_{fix}(\theta)$ (step 416). In step 418, an accurate internal energy is calculated with the use of the cylinder pressure $P_{fix}(\theta)$ that has been calculated in the above step 416. In step 420, the MFB is calculated with the use of the value of $PV^{\kappa}_{fix}(\theta)$ that has been calculated in the above step 414.

As described above, according to the system of the fifth embodiment, the thermal strain error superimposed on the value of $PV^{\kappa}(\theta)$ in the range of $\theta_{fix} \leq \theta \leq \theta_{EVO}$ is accurately corrected. Thus, it is possible to keep the accuracy of the sensor at a high level without taking any measures against errors in the sensor in terms of hardware.

In the meantime, with the fifth embodiment described above, by determining the cylinder pressure reduction amount ΔP based on the correction amount K, it is possible to calculate the value of the cylinder pressure $P_{fix}(\theta)$ that is accurately corrected. Thus, it is possible to accurately calculate the indicated torque and the indicated mean effective pressure with the use of the cylinder pressure $P_{fix}(\theta)$. However, when the cylinder pressure $P_{fix}(\theta)$ is calculated for each crank angle to calculate the indicated torque and the indicated mean effective pressure described above, the calculation load is high. Thus, the correlation between the indicated torque (or the indicated mean effective pressure) and both of the correction amount K and the engine speed and the correlation between the indicated torque correction amount (or the indicated mean effective pressure correction amount) and both of the correction amount K and the engine speed may be directly defined in maps. In this way, it is possible to accurately calculate the indicated torque (or the indicated mean effective pressure) while reducing the calculation load.

In the fifth embodiment described above, the value of $PV^{\kappa}$ may be regarded as the "heat generation amount" of the invention and the value of $\Delta PV^{\kappa}(\theta)$ may be regarded as the "heat generation amount error" of the invention. In addition, the "heat generation amount calculation section" of the invention is realized by the execution of the above step 402 by the ECU 40 and the "heat generation amount error calculation section" of the invention is realized by the execution of the above step 414 by the ECU 40.

In the fifth embodiment described above, $PV^{\kappa}_{fix}(\theta)$ may be regarded as the "actual heat generation amount" of the invention. In addition, the "actual heat generation amount calculation section" of the invention is realized by the execution of the above step 414 by the ECU 40.

In the fifth embodiment described above, $P_{fix}(\theta)$ may be regarded as the "actual cylinder pressure" of the invention. In addition, the "actual cylinder pressure calculation section" of the invention is realized by the execution of the above step 416 by the ECU 40.

In the fifth embodiment described above, the correction amount K may be regarded as the "correction coefficient" of the invention. In addition, the "correction coefficient calculation section" of the invention is realized by the execution of the above step 406 by the ECU 40, the "estimation section" of the invention is realized by the execution of the above step 408 by the ECU 40, and the "correction section" of the invention is realized by the execution of the above step 412 by the ECU 40.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

The invention claimed is:

1. An internal combustion engine controller configured to correct errors caused by thermal strain of a cylinder pressure sensor comprising:
a cylinder pressure sensor that detects a cylinder pressure at a predetermined crank angle of an internal combustion engine; and
a heat generation amount calculation section configured to, with the use of the cylinder pressure detected by the cylinder pressure sensor, a cylinder volume when the cylinder pressure is detected, and a specific heat ratio of a gas in a cylinder, calculate a heat generation amount that is a product of the cylinder pressure and a value that is obtained by raising the cylinder volume to the power of the specific heat ratio;
wherein
a heat generation amount error calculation section is configured to, with the use of a correlation between the heat generation amount in an adiabatic process after completion of combustion and crank angles, calculate a heat generation amount error at the predetermined crank angle in the adiabatic process, wherein
the heat generation amount error calculation section includes a correction coefficient calculation section configured to calculate a correction coefficient that determines the correlation between the heat generation amount and the crank angles, with the use of the heat generation amount at at least two points in the adiabatic process, wherein the heat generation amount error calculation section calculates the heat generation amount error with the use of a crank angle period from a start crank angle after completion of combustion, at which the adiabatic process starts, to the predetermined crank angle, and the correction coefficient, and
further comprising a correction section configured to correct the cylinder pressure detected by the cylinder pressure sensor, in accordance with the heat generation amount error calculated by the heat generation amount error calculation section.

2. The internal combustion engine controller according to claim 1, further comprising an actual heat generation amount calculation section configured to calculate, as an actual heat generation amount, a value that is obtained by subtracting the heat generation amount error from the heat generation amount at the predetermined crank angle.

3. The internal combustion engine controller according to claim 2, further comprising an actual cylinder pressure calculation section configured to calculate an actual cylinder pressure at the predetermined crank angle based on the actual heat generation amount.

4. The internal combustion engine controller according to claim 1, wherein the start crank angle is the crank angle, at which the heat generation amount peaks.

5. The internal combustion engine controller according to claim 1, wherein
the start crank angle is the crank angle corresponding to an intersection of a straight line that approximates variation of mass fraction of burned fuel (MFB) in a combustion process and a straight line that approximates variation of MFB in an adiabatic expansion process subsequent to the combustion process.

6. The internal combustion engine controller according to claim 1, further comprising:
a cooling loss calculation section configured to calculate a cooling loss of the heat generation amount at the predetermined crank angle in the adiabatic process; and
a cooling loss elimination section configured to subtract the cooling loss from the actual heat generation amount at the predetermined crank angle.

7. The internal combustion engine controller according to claim 6, wherein
the cooling loss calculation section includes a cooling loss coefficient calculation section configured to calculate a cooling loss coefficient that determines a correlation between the cooling loss and the crank angles based on a water temperature and an engine speed of the internal combustion engine, wherein the cooling loss calculation section is configured to calculate the cooling loss with the use of the cooling loss coefficient and the crank angle period from the start crank angle, at which the adiabatic process starts, to the predetermined crank angle.

8. The internal combustion engine controller according to claim 1, wherein
the heat generation amount error calculation section includes:
a correction coefficient calculation section configured to calculate a correction coefficient that determines the correlation between the heat generation amount and the crank angles with the use of the heat generation amount at at least two points in the adiabatic process;
an estimation section configured to estimate a cylinder pressure error at a start crank angle, at which the adiabatic process starts, based on the correction coefficient; and
a correction coefficient section configured to correct the correction coefficient by making the correction coefficient reflect the cylinder pressure error,
wherein the heat generation amount error calculation section is configured to calculate the heat generation amount error with the use of the crank angle period from the start crank angle to the predetermined crank angle and the correction coefficient that has been corrected by the correction section.

9. The internal combustion engine controller according to claim 8, wherein the cylinder pressure sensor has a characteristic that the cylinder pressure error in the adiabatic process is negative and increases in absolute value, and the start crank angle is the crank angle, at which the heat generation amount peaks.

10. An internal combustion engine controller for correcting errors caused by thermal strain of a cylinder pressure sensor comprising:
a cylinder pressure sensor that detects a cylinder pressure at a predetermined crank angle of an internal combustion engine; and
a heat generation amount calculation section configured to, with the use of the cylinder pressure detected by the cylinder pressure sensor, a cylinder volume when the cylinder pressure is detected, and a specific heat ratio of a gas in a cylinder, calculate a heat generation amount that is a product of the cylinder pressure and a value that is obtained by raising the cylinder volume to the power of the specific heat ratio; wherein a start crank angle determination section configured to determine a start crank angle, at which an adiabatic process after completion of combustion starts; and a heat generation amount estimation section configured to take, as an estimate of the heat generation amount in the adiabatic process, the heat generation amount at the start crank angle that has been calculated by the heat generation amount calculation section, and further comprising a correction section configured to correct the cylinder pressure detected by the cylinder pressure sensor, in accordance with the estimated heat generation amount calculated by the heat generation amount estimation section.

11. An internal combustion engine controller for correcting errors caused by thermal strain of a cylinder pressure sensor comprising:

a cylinder pressure sensor that detects a cylinder pressure at a predetermined crank angle of an internal combustion engine; and a heat generation amount calculation section configured to, with the use of the cylinder pressure detected by the cylinder pressure sensor, a cylinder volume when the cylinder pressure is detected, and a specific heat ratio of a gas in a cylinder, calculate a heat generation amount that is a product of the cylinder pressure and a value that is obtained by raising the cylinder volume to the power of the specific heat ratio; wherein a start crank angle determination section configured to determine a start crank angle, at which an adiabatic process after completion of combustion starts; and a heat generation amount estimation section configured to take, as an estimate of the heat generation amount in the adiabatic process, the heat generation amount at the start crank angle that has been calculated by the heat generation amount calculation section a cooling loss calculation section configured to calculate a cooling loss of the heat generation amount at the predetermined crank angle in the adiabatic process; and a cooling loss elimination section configured to subtract the cooling loss from the heat generation amount at the predetermined crank angle.

12. The internal combustion engine controller according to claim 11, wherein the cooling loss calculation section includes a cooling loss coefficient calculation section configured to calculate a cooling loss coefficient that determines a correlation between the cooling loss and the crank angles based on a water temperature and an engine speed of the internal combustion engine, wherein the cooling loss is calculated with the use of a crank angle period from the start crank angle, at which the adiabatic process starts, to the predetermined crank angle, and the cooling loss coefficient.

13. A method of controlling an internal combustion engine for correcting errors caused by thermal strain of a cylinder pressure sensor, said internal combustion engine being equipped with a cylinder pressure sensor that detects a cylinder pressure at a predetermined crank angle, comprising:

with the use of the cylinder pressure detected by the cylinder pressure sensor, a cylinder volume when the cylinder pressure is detected, and a specific heat ratio of a gas in a cylinder, calculating a heat generation amount that is a product of the cylinder pressure and a value that is obtained by raising the cylinder volume to the power of the specific heat ratio; wherein:

with the use of a correlation between the heat generation amount in an adiabatic process after completion of combustion and crank angles, calculating a heat generation amount error at the predetermined crank angle in the adiabatic process, wherein in calculating the heat generation amount error, a correction coefficient that determines the correlation between the heat generation amount and the crank angles is calculated with the use of the heat generation amount at at least two points in the adiabatic process, and the heat generation amount error is calculated with the use of a crank angle period from a start crank angle after completion of combustion, at which the adiabatic process starts, to the predetermined crank angle, and the correction coefficient, and correcting the cylinder pressure detected by the cylinder pressure sensor, in accordance with the heat generation amount error.

14. The internal combustion engine controlling method according to claim 13, further comprising calculating, as an actual heat generation amount, a value that is obtained by subtracting the heat generation amount error from the heat generation amount at the predetermined crank angle.

15. The internal combustion engine controlling method according to claim 14, further comprising calculating an actual cylinder pressure at the predetermined crank angle based on the actual heat generation amount.

16. The internal combustion engine controlling method according to claim 13, wherein the start crank angle is the crank angle, at which the heat generation amount peaks.

17. The internal combustion engine controlling method according to claim 13, wherein the start crank angle is the crank angle corresponding to an intersection of a straight line that approximates variation of mass fraction of burned fuel (MFB) in a combustion process and a straight line that approximates variation of MFB in an adiabatic expansion process subsequent to the combustion process.

18. The internal combustion engine controlling method according to claim 13, further comprising:

calculating a cooling loss of the heat generation amount at the predetermined crank angle in the adiabatic process; and subtracting the cooling loss from the actual heat generation amount at the predetermined crank angle.

19. The internal combustion engine controlling method according to claim 18, wherein in calculating the cooling loss, a cooling loss coefficient that determines a correlation between the cooling loss and the crank angles is calculated based on a water temperature and an engine speed of the internal combustion engine, and the cooling loss is calculated with the use of the cooling loss coefficient and the crank angle period from the start crank angle, at which the adiabatic process starts, to the predetermined crank angle.

20. The internal combustion engine controlling method according to claim 13, wherein in calculating the heat generation amount error, a correction coefficient that determines the correlation between the heat generation amount and the crank angles is calculated with the use of the heat generation amount at at least two points in the adiabatic process, a cylinder pressure error at a start crank angle, at which the adiabatic process starts, is estimated based on the correction coefficient, the correction coefficient is corrected by making the correction coefficient reflect the cylinder pressure error, and the heat generation amount error is calculated with the use of the crank angle period from the start crank angle to the predetermined crank angle and the correction coefficient that has been corrected.

21. The internal combustion engine controlling method according to claim 20, wherein the cylinder pressure sensor has a characteristic that the cylinder pressure error in the adiabatic process is negative and increases in absolute value, and the start crank angle is the crank angle, at which the heat generation amount peaks.

22. A method of controlling an internal combustion engine for correcting errors caused by thermal strain of a cylinder pressure sensor, said internal combustion engine being equipped with a cylinder pressure sensor that detects a cylinder pressure at a predetermined crank angle, comprising:

with the use of the cylinder pressure detected by the cylinder pressure sensor, a cylinder volume when the cylinder pressure is detected, and a specific heat ratio of a gas in a cylinder, calculating a heat generation amount that is a product of the cylinder pressure and a value that is obtained by raising the cylinder volume to the power of the specific heat ratio; characterized by:

determining a start crank angle, at which an adiabatic process after completion of combustion starts; and taking the heat generation amount at the start crank angle as an estimate of the heat generation amount in the adiabatic process; and correcting the cylinder pressure detected by the cylinder pressure sensor, in accordance with the estimated heat generation amount.

23. The internal combustion engine controlling method according to claim 22, wherein;

the cylinder pressure sensor has a characteristic that a cylinder pressure error in the adiabatic process is negative and increases in absolute value; and the crank angle, at which the heat generation amount peaks, is determined as the start crank angle.

24. The internal combustion engine controlling method according to claim 22, further comprising:

calculating a cooling loss of the heat generation amount at the predetermined crank angle in the adiabatic process; and subtracting the cooling loss from the heat generation amount at the predetermined crank angle.

25. The internal combustion engine controlling method according to claim 24, wherein in calculating the cooling loss, a cooling loss coefficient that determines a correlation between the cooling loss and the crank angles is calculated based on a water temperature and an engine speed of the internal combustion engine, and the cooling loss is calculated with the use of a crank angle period from the start crank angle, at which the adiabatic process starts, to the predetermined crank angle, and the cooling loss coefficient.

* * * * *